US011470991B2

(12) United States Patent
Wang et al.

(10) Patent No.: US 11,470,991 B2
(45) Date of Patent: Oct. 18, 2022

(54) AUTOMATED COOKING SYSTEM INCLUDING CONVECTION HEAT PORTS IN COOKING VESSEL ABOVE COLLAR OF SUPPORTING HOUSING

(71) Applicant: Gen-x Robotics, LLC, Wilmington, DE (US)

(72) Inventors: Michael Wang, New York, NY (US); Marcel Botha, Brooklyn, NY (US); Simon Ellison, Brooklyn, NY (US)

(73) Assignee: Gen-x Robotics, LLC, Wilmington, DE (US)

( * ) Notice: Subject to any disclaimer, the term of this patent is extended or adjusted under 35 U.S.C. 154(b) by 703 days.

(21) Appl. No.: 16/419,387

(22) Filed: May 22, 2019

(65) Prior Publication Data

US 2020/0367687 A1    Nov. 26, 2020

(51) Int. Cl.
  *A47J 27/00*    (2006.01)
  *A47J 27/14*    (2006.01)
  *A47J 36/06*    (2006.01)
  *A47J 43/046*   (2006.01)
  *A47J 36/32*    (2006.01)
  *A47J 44/00*    (2006.01)

(52) U.S. Cl.
  CPC ............ *A47J 27/004* (2013.01); *A47J 27/14* (2013.01); *A47J 36/06* (2013.01); *A47J 36/32* (2013.01); *A47J 43/046* (2013.01); *A47J 44/00* (2013.01)

(58) Field of Classification Search
  CPC .......................... A47J 37/0641; A47J 37/0623
  USPC ....................................................... 219/622
  See application file for complete search history.

(56) References Cited

U.S. PATENT DOCUMENTS

| 3,850,331 | A | * | 11/1974 | Oxel | ...................... | A47J 37/06 |
| | | | | | | 220/744 |
| 3,963,220 | A | | 6/1976 | Ohchi | | |
| 3,999,680 | A | | 12/1976 | Cho | | |
| 4,219,318 | A | | 8/1980 | Cavalli | | |

(Continued)

FOREIGN PATENT DOCUMENTS

| DE | 202016001160 U1 * | 4/2016 | ............ A47J 37/044 |
| WO | WO-9417708 A1 * | 8/1994 | .......... A47J 37/0623 |

(Continued)

OTHER PUBLICATIONS

U.S. Appl. No. 16/419,921, filed May 22, 2019, Automated Cooking System.

(Continued)

*Primary Examiner* — Ibrahime A Abraham
*Assistant Examiner* — Spencer H. Kirkwood
(74) *Attorney, Agent, or Firm* — Schwegman Lundberg & Woessner, P.A,

(57) ABSTRACT

A cooking assembly can include a cooking vessel, a mixer, and a motor. The cooking vessel can include a bottom contact portion including a first bore therethrough, a heating portion spaced above the bottom contact portion and including a second bore therethrough, and a sidewall connected to the heating portion and together with the heating portion configured to retain food in the cooking vessel. The mixer can be located within the cooking vessel, where the mixer configured to rotate relative to the heating portion. The motor can be connected to the mixer via the first bore and the second bore to drive the mixer to rotate.

15 Claims, 22 Drawing Sheets

(56) References Cited

U.S. PATENT DOCUMENTS

| | | | |
|---|---|---|---|
| 4,919,950 | A | 4/1990 | Mak |
| 6,927,366 | B2 | 8/2005 | Sawhney et al. |
| 7,355,150 | B2 | 4/2008 | Baarman et al. |
| 8,334,004 | B2 | 12/2012 | Liu |
| 8,692,164 | B2 | 4/2014 | Krishnan |
| 9,040,881 | B2 | 5/2015 | Mcintyre et al. |
| 9,693,654 | B2 | 7/2017 | Smith |
| 9,888,803 | B2 | 2/2018 | Xu et al. |
| 9,918,589 | B2 | 3/2018 | Takahashi et al. |
| 2002/0027175 | A1 | 3/2002 | Capp |
| 2006/0219100 | A1 | 10/2006 | Gelfand |
| 2007/0000915 | A1 | 1/2007 | Cheng |
| 2009/0297678 | A1 | 12/2009 | Liu |
| 2013/0001220 | A1 | 1/2013 | Alet Vidal et al. |
| 2014/0000462 | A1 | 1/2014 | Payen |
| 2015/0144006 | A1 | 5/2015 | Sudhir |
| 2015/0182070 | A1 | 7/2015 | Leijenaar et al. |
| 2015/0320260 | A1 | 11/2015 | Takahashi et al. |
| 2015/0351577 | A1 | 12/2015 | Tan et al. |
| 2015/0373787 | A1* | 12/2015 | Visher ............... H05B 6/062 219/622 |
| 2016/0174771 | A1* | 6/2016 | Benoit ................ A47J 27/04 99/348 |
| 2016/0353748 | A1 | 12/2016 | Ozawa et al. |
| 2017/0347833 | A1 | 12/2017 | Ohta et al. |
| 2018/0064281 | A1 | 3/2018 | Collins |
| 2018/0077760 | A1 | 3/2018 | Isago et al. |
| 2018/0140132 | A1 | 5/2018 | He |
| 2018/0160840 | A1 | 6/2018 | De' Longhi |
| 2018/0177339 | A1 | 6/2018 | Hua |
| 2018/0184848 | A1 | 7/2018 | De' Longhi |
| 2018/0199401 | A1 | 7/2018 | Moon |
| 2018/0344090 | A1 | 12/2018 | Cox et al. |
| 2019/0082877 | A1 | 3/2019 | Dumenil |
| 2019/0125126 | A1 | 5/2019 | Cohen |
| 2019/0313844 | A1* | 10/2019 | Nadendla ............... A47J 36/32 |
| 2020/0249660 | A1 | 8/2020 | Rao et al. |

FOREIGN PATENT DOCUMENTS

| | | | |
|---|---|---|---|
| WO | WO-2014067252 | A1 | 5/2014 |
| WO | WO-2017063471 | A1 | 4/2017 |
| WO | WO-2017132818 | A1 | 8/2017 |

OTHER PUBLICATIONS

U.S. Appl. No. 16/419,960, filed May 22, 2019, Automated Cooking System.

"U.S. Appl. No. 16/419,921, Non Final Office Action dated Jul. 21, 2021", 18 pages.

"U.S. Appl. No. 16/419,921, Response filed Oct. 1, 2021 to Non Final Office Action dated Jul. 21, 2021", 21 pages.

"U.S. Appl. No. 16/419,921, Final Office Action dated Jan. 6, 2022", 21 pgs.

"U.S. Appl. No. 16/419,960, Non Final Office Action dated Feb. 24, 2022", 23 pgs.

"U.S. Appl. No. 16/419,921, Examiner Interview Summary dated Mar. 2, 2022", 2 pgs.

"U.S. Appl. No. 16/419,921, Response Filed Feb. 28, 2022 to Final Office Action dated Jan. 6, 2022", 18 pgs.

"U.S. Appl. No. 16/419,921, Notice of Allowance dated Apr. 1, 2022", 12 pgs.

"U.S. Appl. No. 16/419,921, Corrected Notice of Allowability dated Apr. 11, 2022", 3 pgs.

* cited by examiner

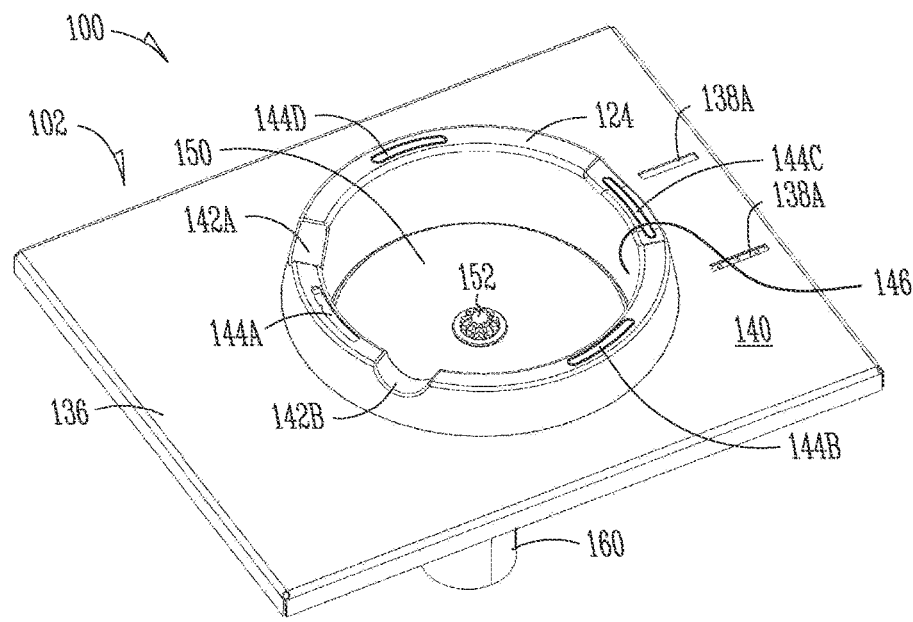
Fig.2A
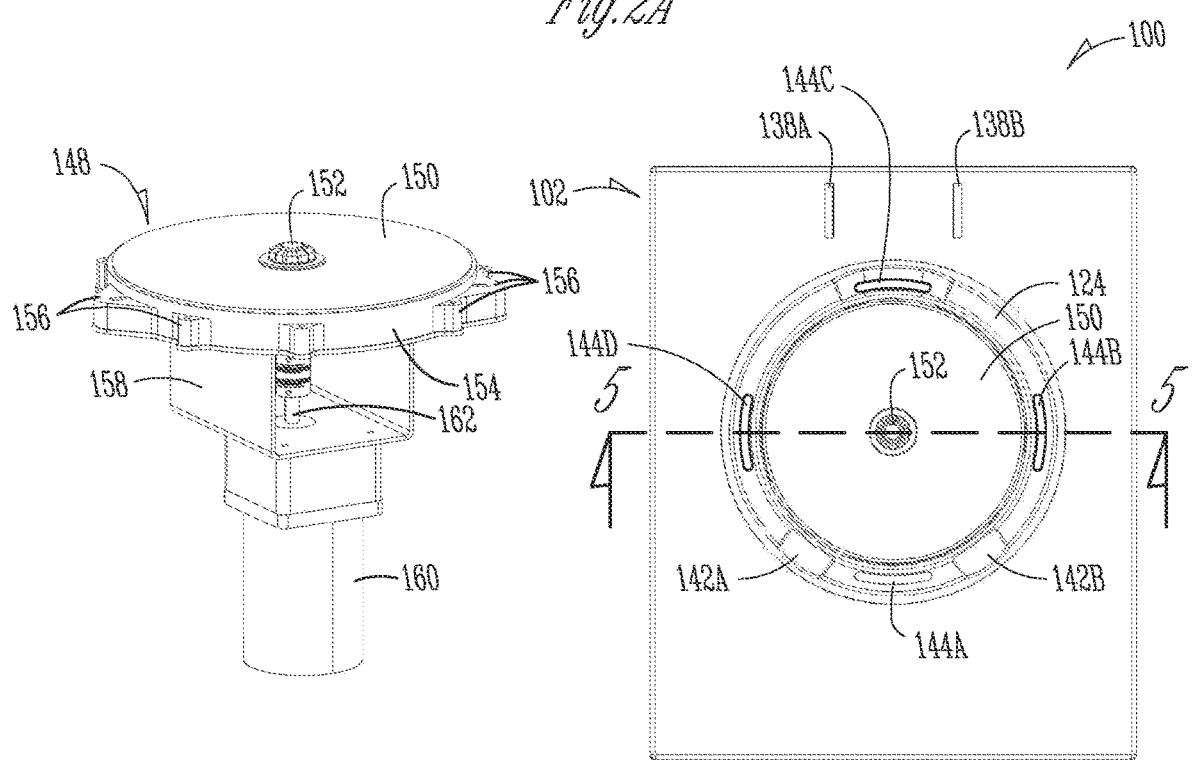
Fig.2B
Fig.2C

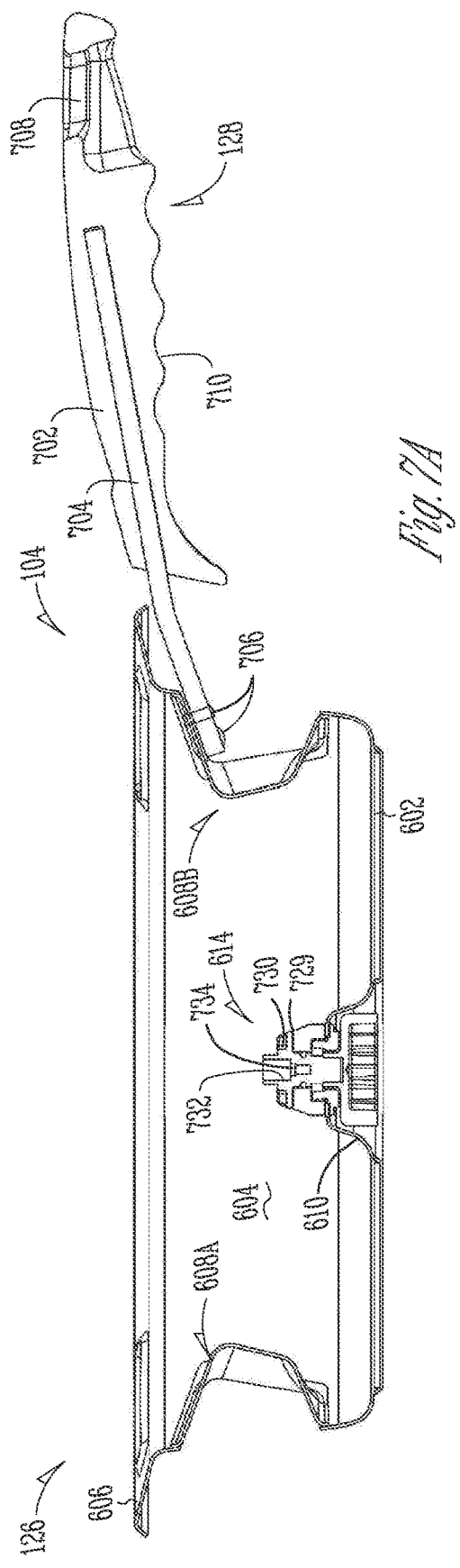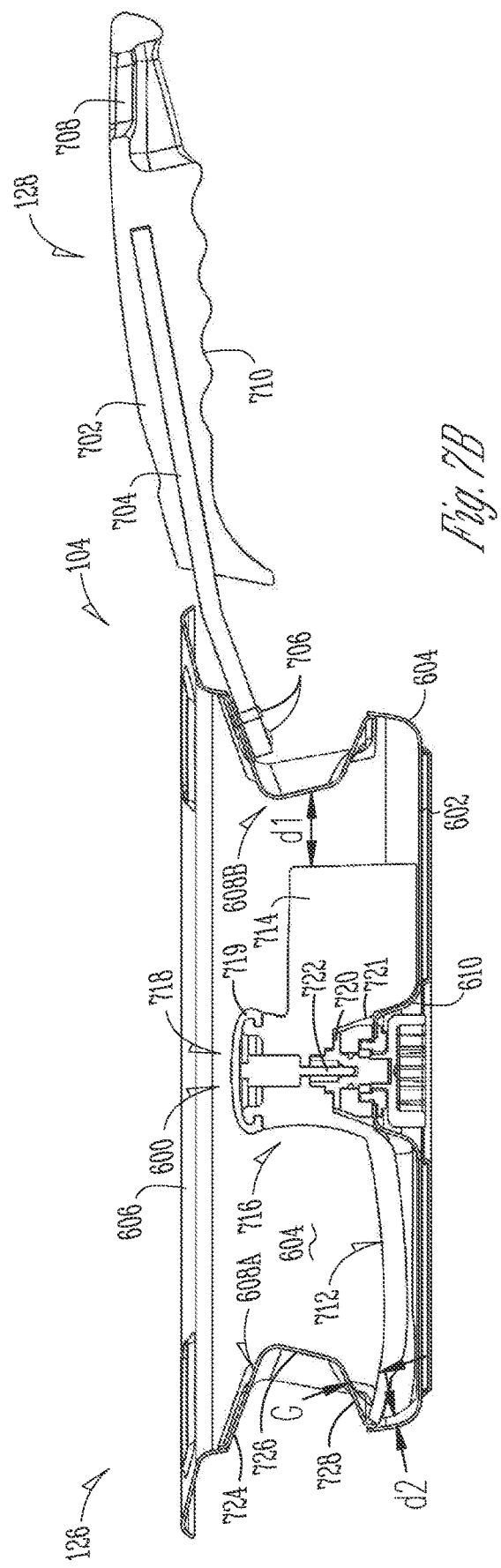

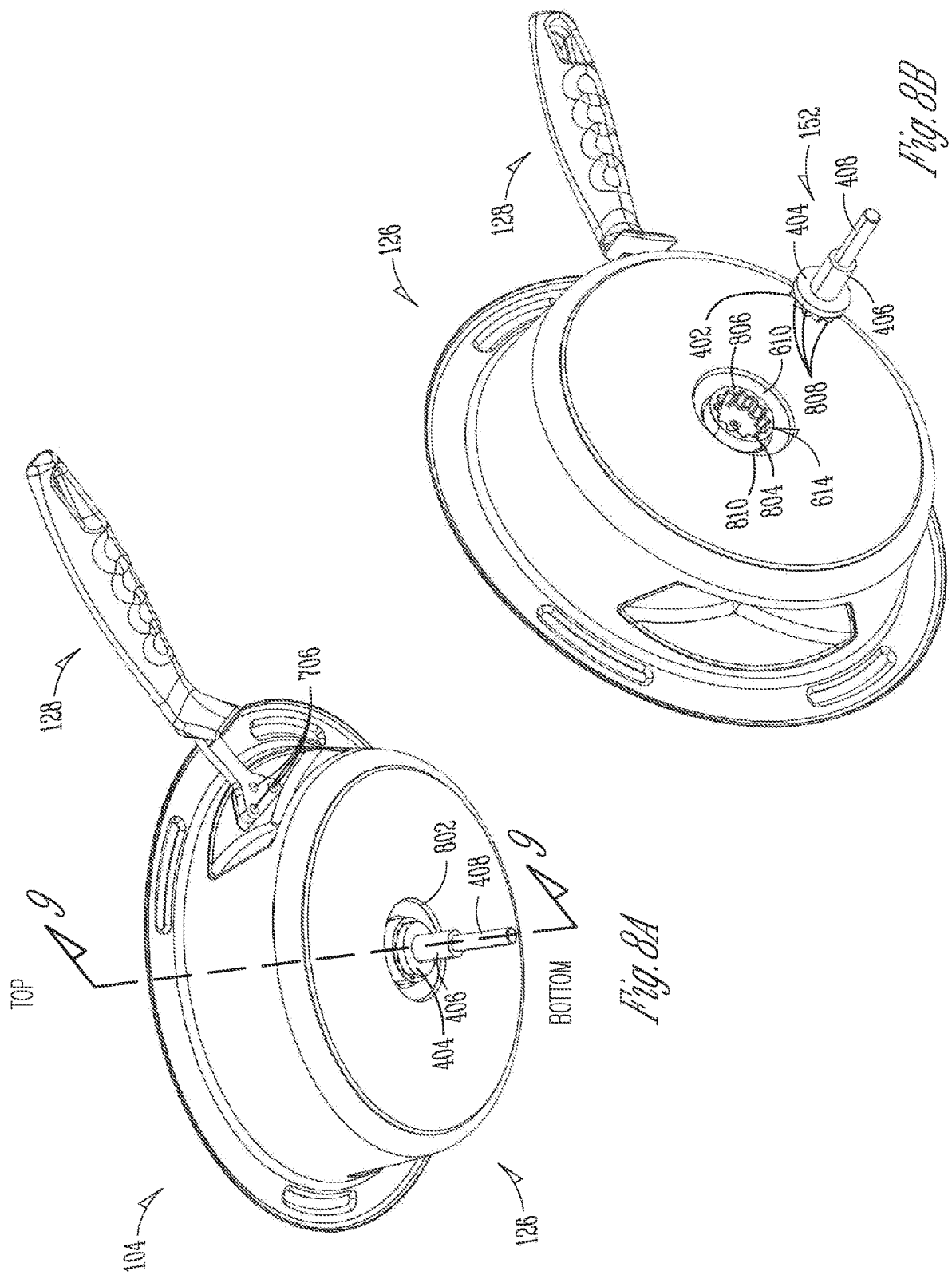

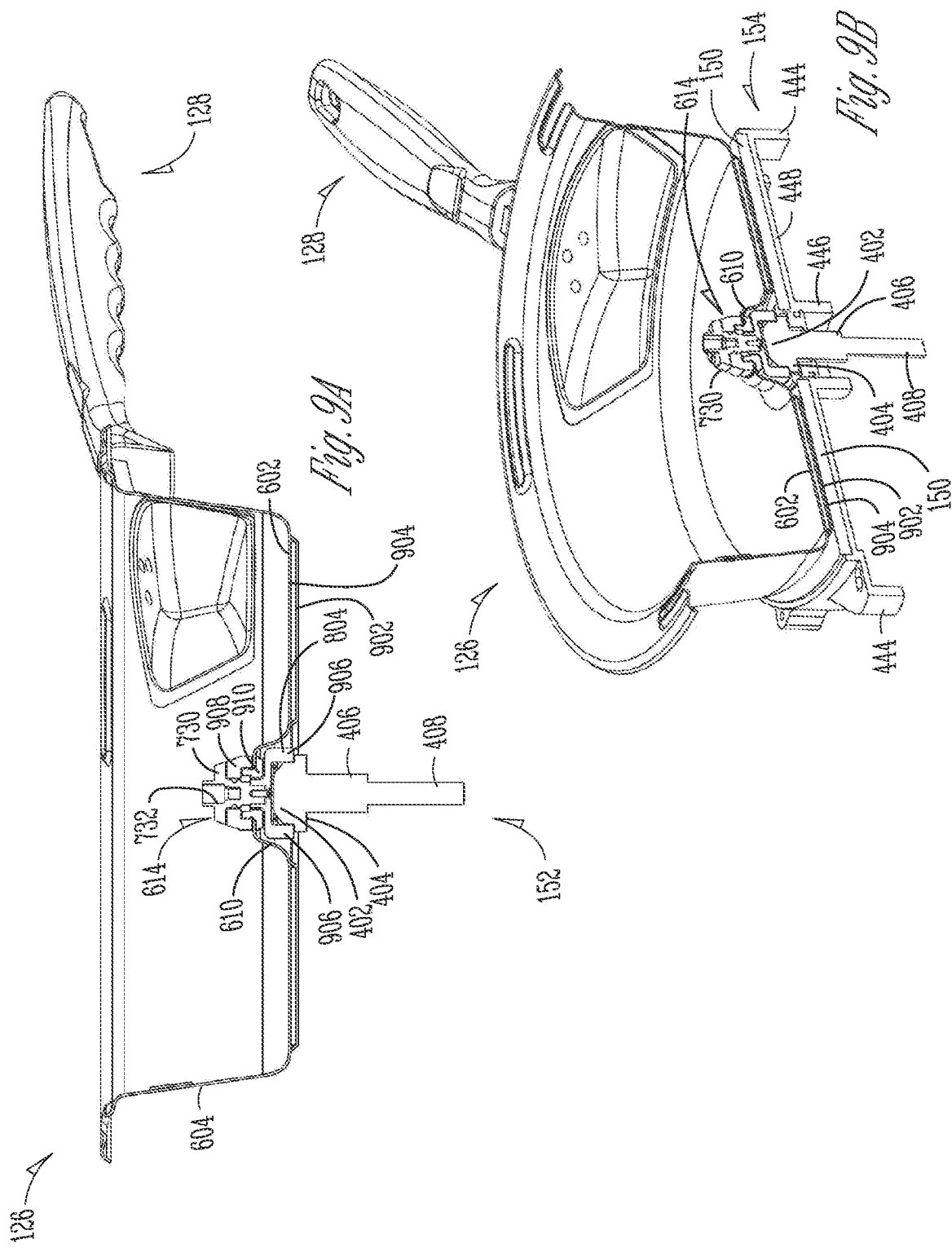

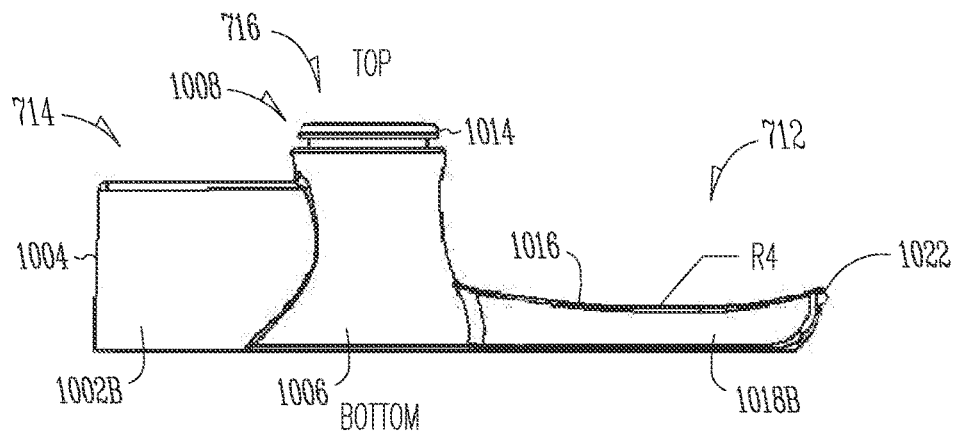
Fig. 10D
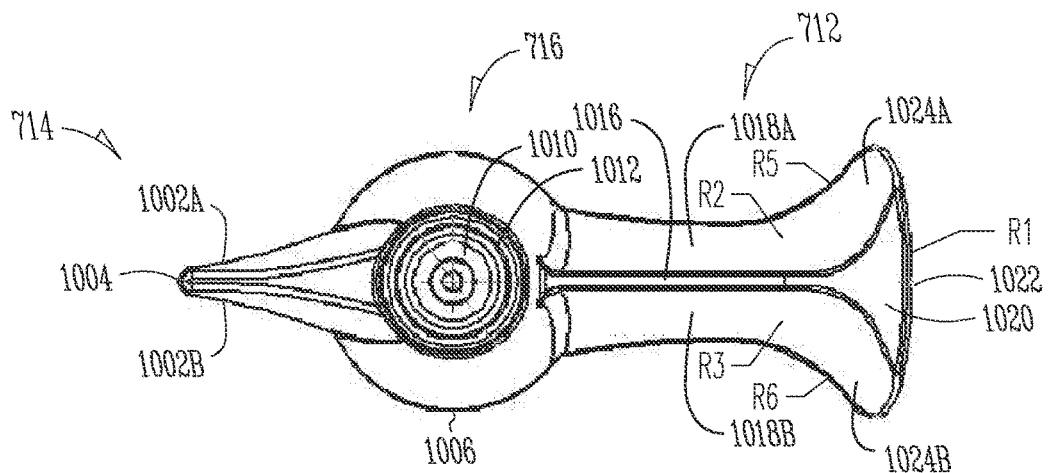
Fig. 10E
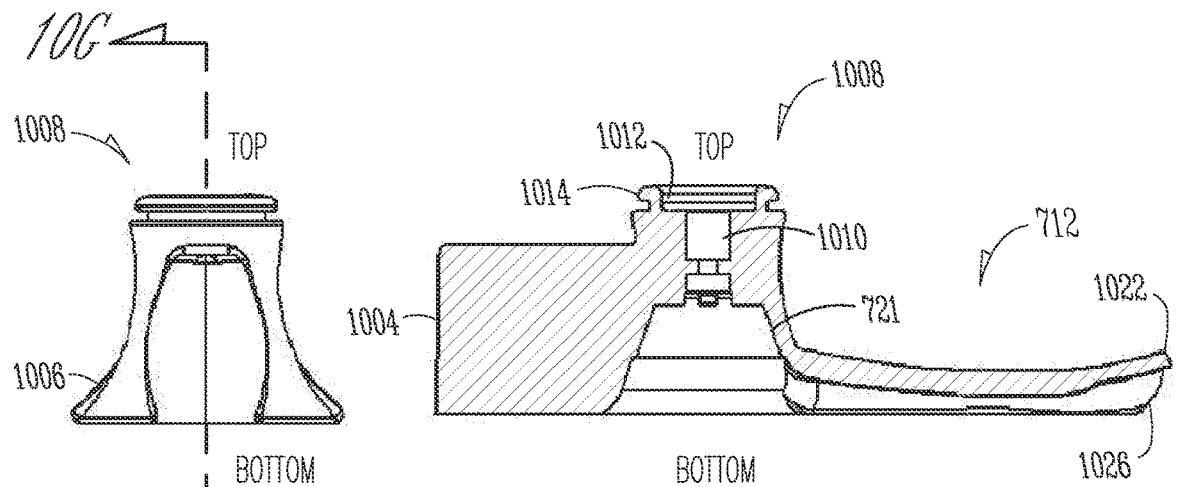
Fig. 10F
Fig. 10G

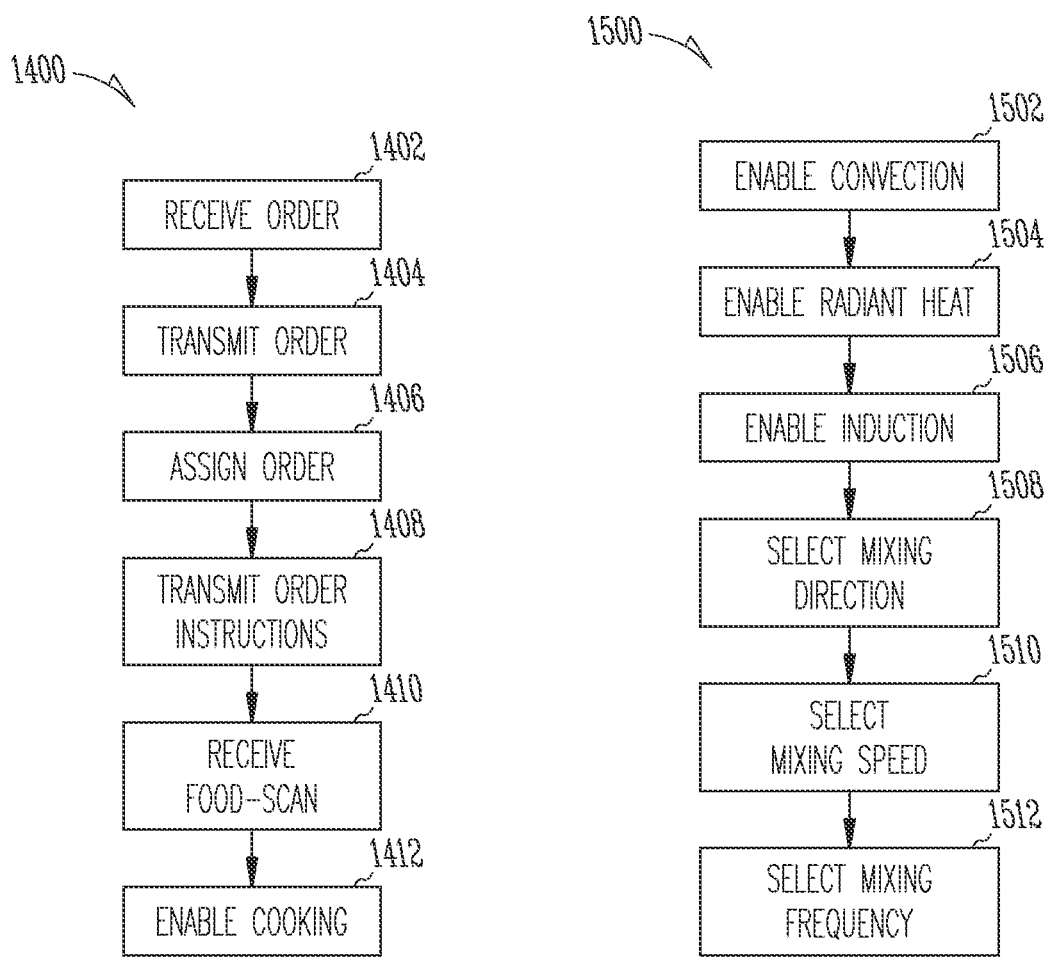

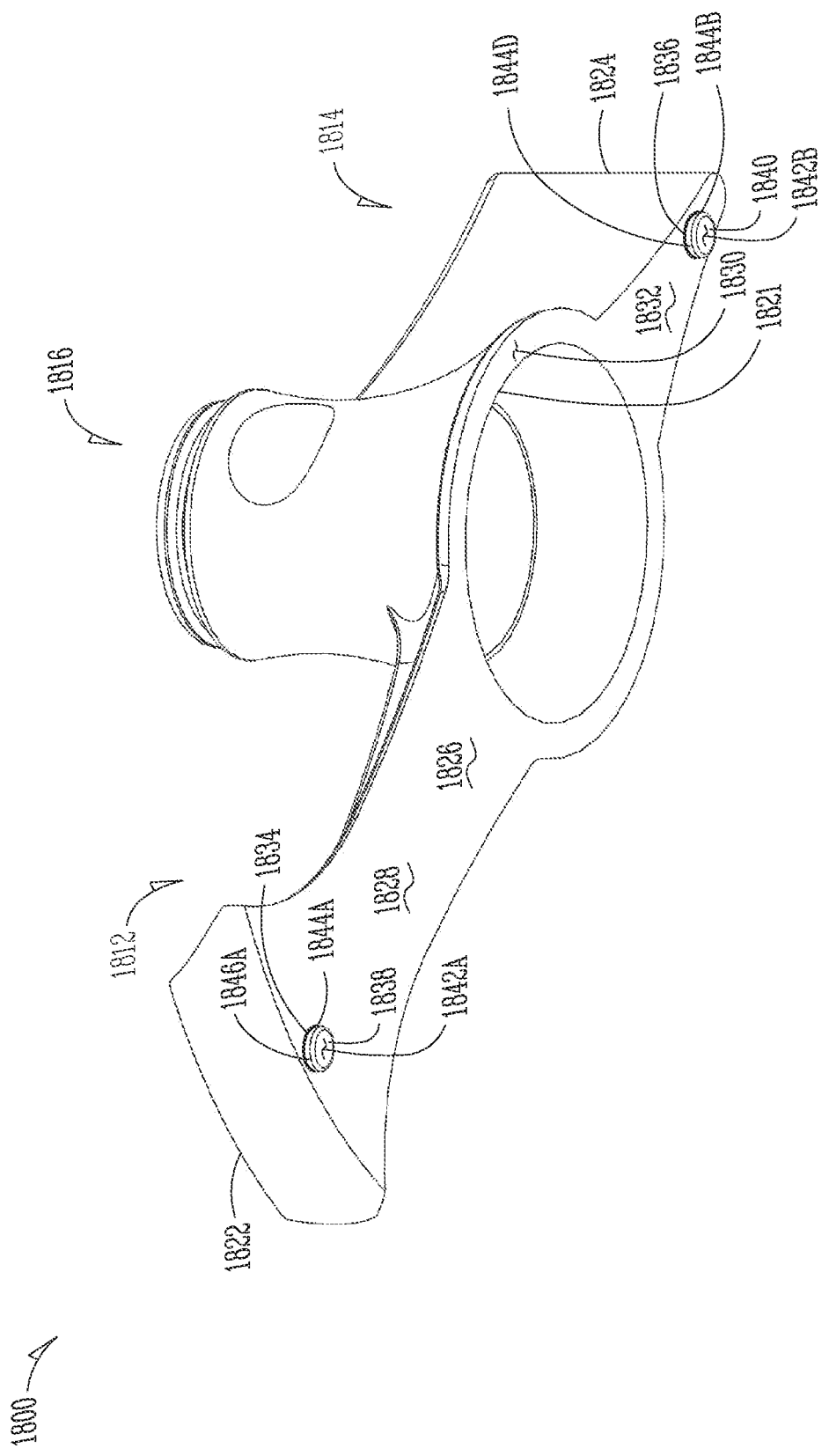

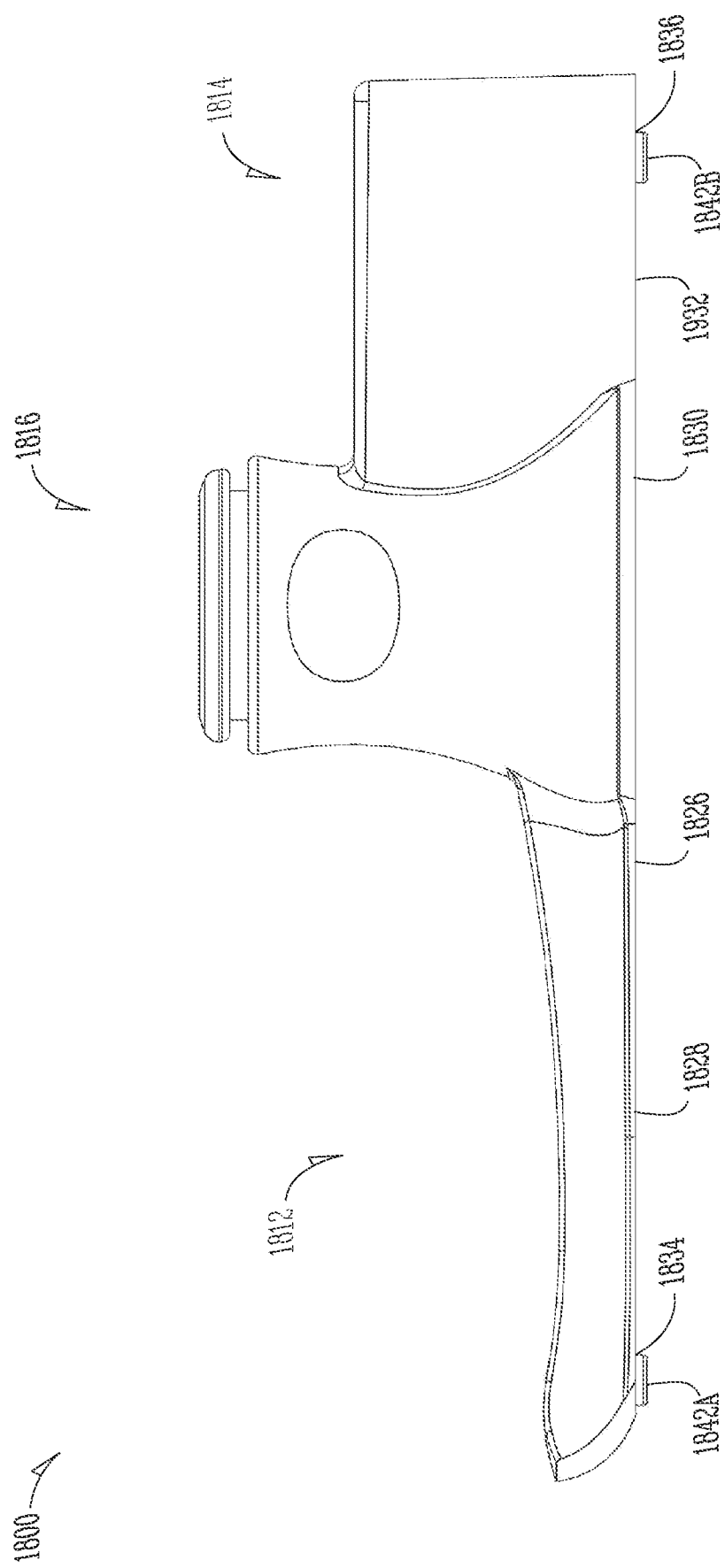

AUTOMATED COOKING SYSTEM INCLUDING CONVECTION HEAT PORTS IN COOKING VESSEL ABOVE COLLAR OF SUPPORTING HOUSING

BACKGROUND

Foods sold at diners, restaurants, and fast food restaurants may require a relatively large amount of labor to prepare and deliver cooked food to a customer. Often, to prepare a dish, ingredients must be unpackaged by hand, measured by hand, and combined into a cooking apparatus, such as a pan, fryer, or oven. A chef or cook then often attends to the food during the cooking process before transferring the food to a plate or serving container. In some cases, a food expeditor (expo) may add garnishes and finalize preparations before delivery to a customer by a server or cashier. The resulting food must be delivered to be served while it is still fresh.

The Chinese food service industry requires a relatively large amount of manual labor to prepare food for customers. Often, preparation of Chinese food requires intensive labor, such as operating a wok, which requires constant movement or agitation of the food to cook the food evenly and avoid burning. Some parts of the Chinese food industry have seen a rise in cost of food labor due to increases in wages and benefits in many major cities along with a labor supply issue caused in part by increasing education levels of the population. Moreover, many Chinese food restaurants lack standardized processes employed by other restaurants types (hamburger chains, for example), which could help offset the rising costs of Chinese food production. A lack of standardized processes and a reliance on manual labor make scaling of Chinese food (and similar cuisine) restaurants relatively difficult.

There is a need in the art for improved apparatus and processes for cooking food that heats the food evenly and properly, avoids burning, and readily served in dishes or placed in containers for delivery. There is a further need in the art for improved apparatus and processes for preparing Chinese food that heats it evenly and properly, avoids burning, and is readily served in dishes or placed in containers for delivery.

BRIEF DESCRIPTION OF THE DRAWINGS

In the drawings, which are not necessarily drawn to scale, like numerals describe similar components in different views. Like numerals having different letter suffixes represent different instances of similar components. The drawings illustrate generally various examples discussed in the present application, but are not intended to be an exhaustive or exclusive collection of examples.

FIG. 2A shows a top isometric view of a portion of an automated cooking system, according to one embodiment of the present subject matter.

FIG. 2B shows a side isometric view of a portion of an automated cooking system, according to one embodiment of the present subject matter.

FIG. 2C shows a top view of a portion of an automated cooking system, according to one embodiment of the present subject matter.

FIG. 7A shows a side cross-sectional view of a cooking vessel of an automated cooking system, according to one embodiment of the present subject matter.

FIG. 7B shows a side cross-sectional view of a cooking vessel of an automated cooking system, according to one embodiment of the present subject matter.

FIG. 8A shows a bottom isometric view of a cooking vessel of an automated cooking system, according to one embodiment of the present subject matter.

FIG. 8B shows a bottom isometric view of a cooking vessel of an automated cooking system, according to one embodiment of the present subject matter.

FIG. 9A shows a side cross-sectional view of a cooking vessel of an automated cooking system, according to one embodiment of the present subject matter.

FIG. 9B shows an isometric cross-sectional view of a cooking vessel of an automated cooking system, according to one embodiment of the present subject matter.

FIG. 10D shows a side view of a mixer of an automated cooking system, according to one embodiment of the present subject matter.

FIG. 10E shows a top view of a mixer of an automated cooking system, according to one embodiment of the present subject matter.

FIG. 10F shows a rear view of a mixer of an automated cooking system, according to one embodiment of the present subject matter.

FIG. 10G shows a cross-sectional view of a mixer of an automated cooking system across indicators 10G-10G of FIG. 10F, according to one embodiment of the present subject matter.

FIG. 14 shows a flow chart of a method of operating an automated cooking system, according to one embodiment of the present subject matter.

FIG. 15 shows a flow chart of a method of operating an automated cooking system, according to one embodiment of the present subject matter.

FIG. 18C shows an isometric view of a mixer of an automated cooking system, according to one embodiment of the present subject matter.

FIG. 18D shows a side view of a mixer of an automated cooking system, according to one embodiment of the present subject matter.

DETAILED DESCRIPTION

Figure 1A:
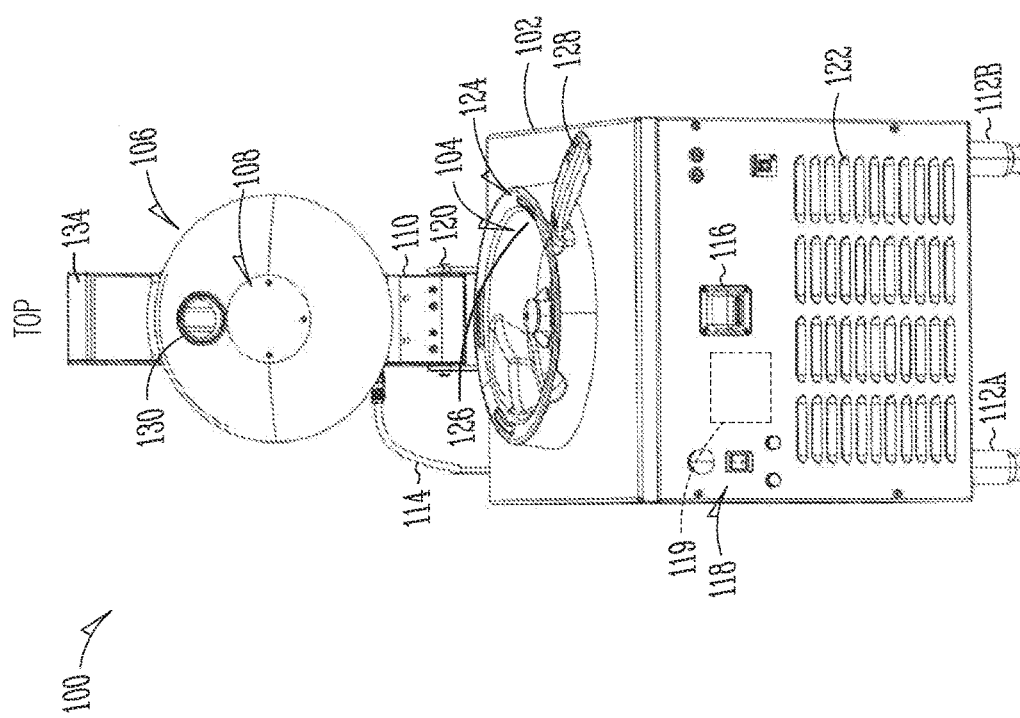
FIG. 1A shows an isometric view of an automated cooking system in a first state, according to one embodiment of the present subject matter.

Like many food service industries, the Chinese food service industry requires a large amount of manual labor to prepare food for customers. Often, preparation of Chinese food requires intensive labor, such as operating a wok, which requires constant movement or agitation of the food to cook the food evenly and avoid burning. Some parts of the Chinese food industry have seen a rise in cost of food labor due to increases in wages and benefits in many major cities along with a labor supply issue caused in part by increasing education levels of the population. Moreover, many Chinese food restaurants lack standardized processes employed by other restaurants types (hamburger chains, for example), which could help offset the rising costs of Chinese food production. A lack of standardized processes and a reliance on manual labor make scaling of Chinese food (and similar cuisine) restaurants relatively difficult.

This disclosure addresses these and other problems by simplifying and automating several aspects of food production, such as receiving orders, mixing ingredients, and cooking the food for each customer. In various embodiments, the methods and processes disclosed lend themselves especially well to the preparation of Chinese food. In various embodiments, an automated cooking system includes a housing and a cooking vessel, such as a pan or wok, removably connected to the housing. The cooking system can further include an induction heating device within the housing positioned near the cooking vessel, where the induction heating device can heat the cooking vessel using induction. A lid of the cooking system can be coupled to the housing and movable between a covered and an uncovered position, where the lid can cover the cooking vessel in the covered position. The cooking system can further include a radiant heater connected to the lid, where the radiant heater can transfer radiant heat toward and to the cooking vessel when the lid is in the closed position. In various embodiments, the radiant and inductive heating apparatus are used in conjunction to prepare food. In various embodiments, the radiant and inductive heating apparatus are controlled by programs which enhance the accuracy and repeatability of the food preparation. In various embodiments, the programming is dependent on the type and quantity of the food prepared.

This system and similar systems described further herein help reduce the complexity of the food preparation process, by enabling tight control of the cooking process through the use of multiple heat types. In various embodiments, the system includes a controller configured to operate one or more of a mixer of the cooking vessel, the induction heater, the radiant heater, and a convection heater based on a cooking algorithm to cook food within the cooking vessel. The controller helps to provide consistent and/or standard cooking procedures increase food quality and consistency. In some cases, it may allow for preparation of food by an attendant who does not require the level of skill and understanding of the food being prepared, but can operate the machine to produce a high quality and delicious food for the consumer as if they had years of experience in such preparation. Further, because a majority of the cooking operations can be performed by the automated cooking system, the system can help improve safety during cooking procedures.

Further variations of an automated cooking system according to the present subject matter include a convection heater located within the housing and configured to deliver hot air to the cooking vessel to provide a third type of heat to the cooking vessel and food. In various embodiments, the automated cooking system can also include a mixer positioned within the cooking vessel, where the mixer can rotate relative to the cooking vessel. The system can include a motor located within the housing and operable to drive the mixer to rotate.

In these examples, the automated cooking system includes the controller configured to operate a cooking algorithm, where the cooking algorithm is configured to, depending on the ingredients within the cooking vessel, independently adjust a speed of the motor, and heat produced by each of the induction heater, the radiant heater, and the convection heater to cook the food within the vessel. The cooking algorithm can also be configured to operate the mixer in both rotational directions at various time intervals during cooking.

Because these and other features discussed herein can perform a large portion of required cooking operations, the automated cooking system reduces the amount of training required to deliver top-quality food, which can help reduce labor costs and food prices. Also, because the cooking operations performed by the automated cooking system can be tightly controlled, an amount of oil used during cooking operations can be reduced, which can help reduced waste, improve food quality, and improve healthiness over traditional frying and cooking with a wok. Further, the automated cooking process can help reduce operator (cook) exposure to open flame and hot oil during cooking operations, which can create a more enjoyable (cooler) and safer work environment.

Another aspect of various embodiments of this disclosure are that they provide a data-driven platform where the cooking process is integrated with a point-of-sale (POS) system, intermediate computer system, and/or marketing platform to enable real-time data analysis to guide decision making process for business, to help reduce spoilage, increase efficiency, and drastically improve customer experience by providing food that is cooked faster (fresher) without reducing quality. The controller and/or intermediate computer system can log data and analyze the data for process and algorithm improvement. The controller and/or intermediate computer system can also distribute updates to other controllers and/or intermediate computer systems to help centralize preparation procedures, improving food consistency and quality.

This overview is intended to provide an overview of subject matter of the present patent application. It is not intended to provide an exclusive or exhaustive explanation of the invention. The detailed description is included to provide further information about the present patent application.

Figure 1B:
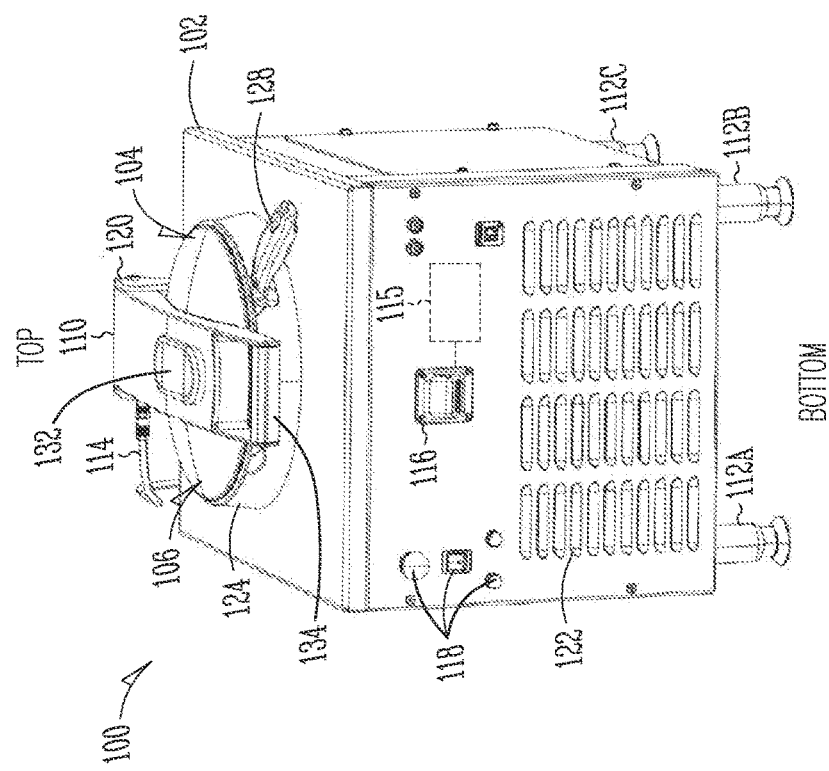
FIG. 1B shows an isometric view of an automated cooking system in a second state, according to one embodiment of the present subject matter.

FIG. 1A shows an isometric view of an automated cooking system 100 with an open lid, according to one embodiment of the present subject matter. FIG. 1B shows an isometric view of the automated cooking system 100 with a closed lid, according to one embodiment of the present subject matter. FIGS. 1A and 1B are discussed below concurrently.

The automated cooking system 100 can include a housing 102, a cooking vessel 104, a lid 106, a radiant heater 108, an arm 110, feet 112a-112d (only feet 112a-112c are visible in FIGS. 1A and 1B), a power line 114, a controller 115, a sensor 116, controls 118, and a convection heater 119. The housing 102 can include a bracket 120, louvers 122, and a collar 124. The cooking vessel 104 can include a wok 126 and a handle 128. The lid (or cover) 106 can include a spice port 130. The arm can include a door 132 and a handle 134.

The housing 102 can be a rigid or semi-rigid body comprised of materials such as metals, plastics, foams, elastomers, ceramics, composites, or combinations thereof. In some examples, the housing 102 can be made of metals resistant to heat, such as steel and steel alloys. In some examples, the housing can be made of materials resistant to corrosion, such as stainless-steel alloys. The housing 102 can include one or more internal insulation layers configured to limit transfer of heat from the cooking system 100 to an ambient environment, such as a kitchen or food preparation area. The housing 102 can also include a frame or structure configured to support the components within and connected to the housing 102.

The cooking vessel 104 can include the wok 126 and the handle 128. The wok 126 can be a rigid or semi-rigid body comprised of materials such as metals, plastics, ceramics, composites, or combinations thereof. In some examples, the wok 126 can be comprised of materials appropriate for heating food, while resisting corrosion, such as carbon steel, cast iron, aluminum, stainless steel alloys, or the like. In some examples, the wok 126 includes a non-stick coating, such as Perfluoroalkoxy. In various embodiments, the wok 126 includes a non-stick Polytetrafluoroethylene coating. In various embodiments the wok 126 includes various ceramics. Other non-stick coatings may be used without departing from the scope of the present subject matter. In various embodiments, combinations of non-stick coatings are used.

The handle 128 can be can be a rigid or semi-rigid member comprised of materials such as metals, plastics, foams, elastomers, ceramics, composites, and combinations thereof. The handle 128 can be sized and shaped to be grasped and used to open the lid 106. The handle 128 is coupled to the wok 126 at a distal portion of the handle 128.

The radiant heater 108 can be a heater connected to an inner portion of the lid 106 and can be connected to the housing 102 via the power line 114. In some examples, the power line 114 can connect to the radiant heater 108 via the arm 110. The power line 114 can also connect to a power source (such as a transformer within the housing 102) and can be powered using external AC or DC power. In some examples, the housing 102 can encase a convective heater 119 therein, which can be configured to provide hot air to the cooking vessel using intake air from the louvers 122 and discharging hot air through ports through the collar 124 and the cooking vessel 104.

The feet 112 can be rigid or semi-rigid body comprised of materials such as metals, plastics, ceramics, composites, or combinations thereof. The feet 112 can be connected to a bottom side of the housing 102 and can be configured to engage a floor surface to support the automated cooking system 100. The automated cooking system 100 can include four of the feet 112, but can include 3, 5, 6, 7, 8, 9, 10, or the like feet in other examples. In some examples, the feet 112 can be adjustable to balance the housing 102 and/or adjust a height thereof.

The sensor 116 can be an optical scanner or sensor configured to read codes, such as bar codes and/or QR codes. In some examples, the sensor 116 can be a communicative sensor such as an electromagnetic sensor (for example, a near field communication (NFC) sensor). The scan sensor 116 can be electrically connected to the controller 115 located within the housing 102 (and/or a remote system), as discussed in further detail below. The sensor 116 can be configured to produce a scan signal based on a scan of a package or item.

The controls 118 can extend through a front side or a front panel of the housing 102 and can be connected to the controller 115 located within the housing 10. The controls 118 can be manually operable to operate the automated cooking system 102 and can include, for example, a power button, timer, heat settings, or the like.

The controller 115 can be a programmable controller, such as a single or multi-board computer, a direct digital controller (DDC), a microcontroller, or a programmable logic controller (PLC). In various embodiments, the controller is a dedicated device for controlling the system. It includes a specific user interface for cooking applications. In other examples the controller 115 can be any computing device, such as a handheld computer, for example, a smart phone, a tablet, a laptop, a desktop computer, or any other computing device including a processor and wireless communication capabilities. It need not be a dedicated device, but can execute code adapted to perform the controller function, among other things. In various embodiments the controller function is local. In various embodiments, the controller is remote. In various embodiments, the controller function can be performed locally or remotely. In such embodiments, the cooking function can be tested or illustrated by a remote user. In such embodiments, a remote user can intervene in a cooking function if the local operator is busy, or otherwise unable to. In various embodiments a remote monitoring function is provided and a remote operator may determine that the local function could benefit from remote intervention. In such cases, the remote operator may take over control of the cooking function, or merely optimize the cooking function. Various authorization applications may be employed to make sure a remote operator is authorized to intervene or control the cooking function.

The bracket 120 can be connected to the housing and can extend therefrom above a top surface of the housing. The bracket 120 can be configured to receive the arm 110 and to secure the arm 110 to the housing 102 using, for example, fasteners (bolts, screws, rivets, hinges, or the like).

The louvers 122 can be openings in the housing 102 configured to intake ambient air and/or to exhaust air to the ambient environment. The louvers 122 can be downturned to help prevent fluids, such as grease and oil, from entering the housing 102.

The collar 124 can be a raised portion of the housing 102 protruding from a top portion of the housing 102. The collar 124 can have a substantially cylindrical shape in some examples, and can have other shapes, such as a square prism, a rectangular prism, a truncated cone, or the like. The collar 124 can include ports, vents, and notches, as discussed below in further detail. The collar 124 can be shaped complimentary to the cooking vessel 104, such that the collar 124 can receive the cooking vessel therein and can retain the cooking vessel 104 therein during operations. The collar 124 can also include a radially outer lip configured to engage the lid 106 to form a seal over the cooking vessel 104 to help contain food, fluids, gasses, and heat during cooking operations.

The lid 106 can be a rigid or semi-rigid body comprised of multiple materials and can include a transparent portion (made of glass or plastic, for example) for viewing food within the cooking vessel 104. The lid (or cover) 106 can be connected to the arm 110 and can be pivotable about the bracket 120 to move the lid 106 between a position engaging the collar 124 and/or the cooking vessel 104 (closed) and a position spaced apart from the collar 124 and/or the cooking vessel 104 (open). The lid 106 can include a spice port 130 extending therethrough which can be alignable with the door 132 of the arm 110 such that the door 110 can be opened and closed to allow access to the spice port 130 when the lid 106 is in the closed position (for example, during cooking operations). The handle 134 can be a rigid or semi-rigid member sized and shaped to be grasped and actuated or operated. The handle 134 can be coupled to the arm 110 near the lid 106 and can be operable to move the arm 110 between the open and closed positions.

In operation of some examples, the automated cooking system 100 can be enabled using the controls 118 or via the controller 115 through a remote device. The automated cooking system 100 can receive a cooking order and an algorithm or can retrieve a cooking algorithm based on the received order. In response to the cooking algorithm, the controller 115 can enable one or more of the radiant heater 108, an inductive heater (discussed below), and the convective heater 119 to heat food within the cooking vessel 104. The controller 115 can also operate a mixer within the cooking vessel to turn the food and prevent burning and clumping. When the cooking operation is complete, the lid 106 can be opened and the cooking vessel 104 can be removed for serving of the food and cleaning of the cooking vessel 104, if necessary. The cooking vessel 104 can be returned to its cooking position within the collar 124, the lid 106 can be closed, and another cooking operation can be performed. Additional structure and operations of the automated cooking system 100 are discussed in the various FIGS. below.

FIG. 2A shows a top isometric view of a portion of the automated cooking system 100, according to one embodiment of the present subject matter. FIG. 2B shows a side isometric view of a portion of the automated cooking system 100, according to one embodiment of the present subject matter. FIG. 2C shows a top view of a portion of the automated cooking system 100, according to one embodiment of the present subject matter. FIGS. 2A-2C are discussed concurrently below. The automated cooking system 100 of FIGS. 2A-2C can be consistent with FIGS. 1A-1B; additional details are discussed with respect to FIGS. 2A-2C.

FIGS. 2A-2C show a top panel 136 of the housing 102 removed therefrom. The top panel 136 can include mounts 138a and 138b configured to receive the bracket 120 for mounting the arm 110 (and the lid 106) to the top panel 136. The mounts 138a and 138b can extend upward from a top surface 140 of the top panel 136 and can be welded, fastened, or otherwise secured thereto.

Also shown is collar 124 extending upward from the top surface 140 of the top panel 136. The collar 124 can include handle notches 142a and 142b, which can receive the handle 128 of the cooking vessel 104 therein. The notches 142a and 142b can allow the cooking vessel 104 to engage the heating elements within the housing 102 and can help to position the cooking vessel 104 such that ports 144a-144d of the collar 124 align with ports of the cooking vessel 104. The ports 144a-144d can be ports for transferring air from the convective heater 119 within the housing to the cooking vessel 104 for heating of food within the cooking vessel 104 via convection.

FIG. 2A shows an inner wall 146 of the collar 124 which can be sized to receive an inductive heater 148 therein. The inner wall 146 can also be sized to receive and contain the wok 126 of the cooking vessel 104 therein. The inductive heater 148 can include a top glass 150 and a housing 154 configured to support the top glass 150. The housing 154 can also include mounts 156, which can be configured to receive fasteners therethrough for mounting the inductive heater 148 to the collar 124.

FIG. 2B also shows the motor 160, which can include a shaft 162 extending therefrom and through a motor mount 158 where the shaft 162 can connect to a drive spindle 152. The drive spindle 152 can extend through the housing 154 and the glass 152 to engage a mixer within the cooking vessel 104, as discussed in further detail below.

Figure 3A:
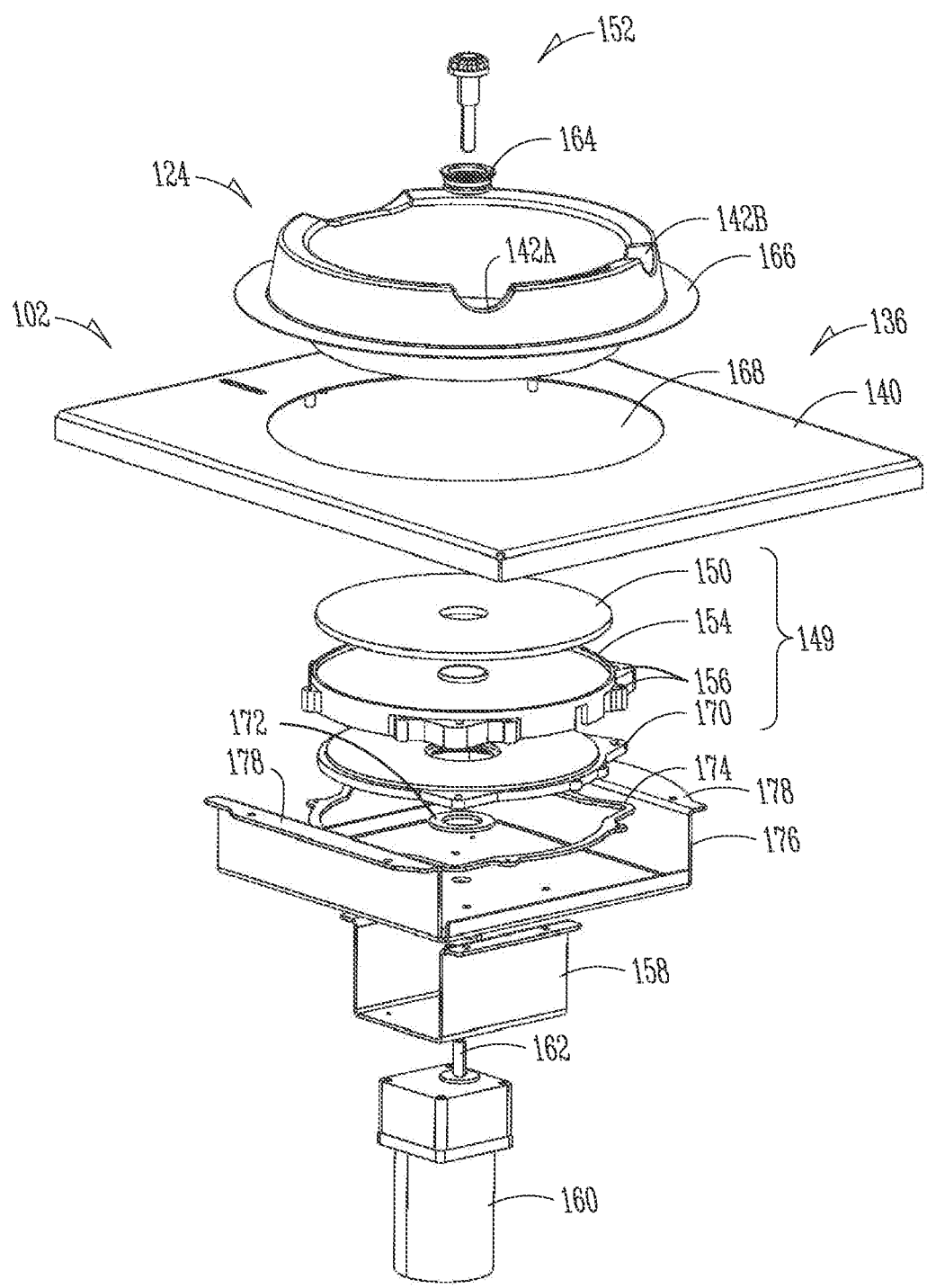
FIG. 3A shows an exploded top isometric view of a portion of an automated cooking system, according to one embodiment of the present subject matter.
Figure 3B:
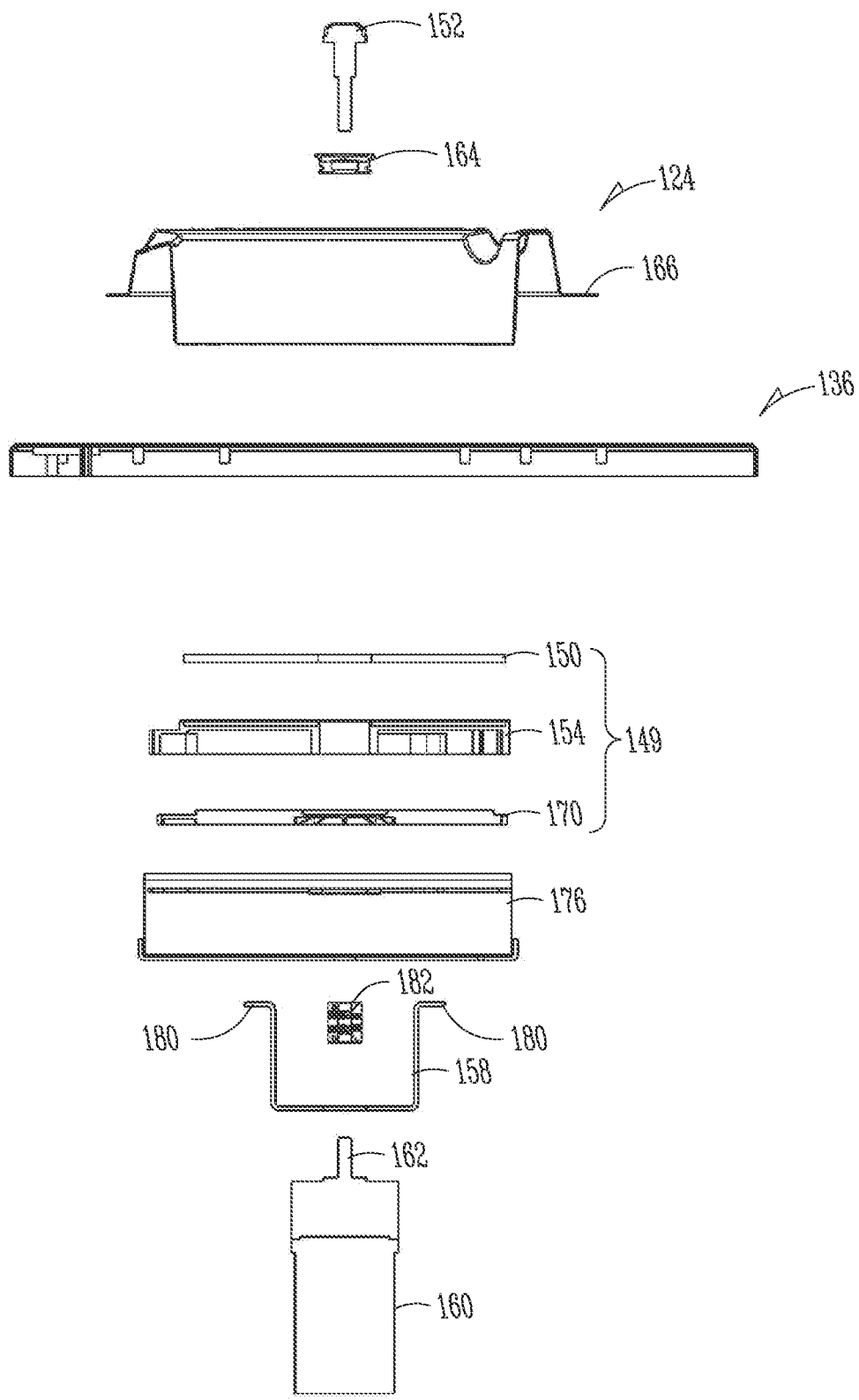
FIG. 3B shows an exploded side view of a portion of an automated cooking system, according to one embodiment of the present subject matter.

FIG. 3A shows an exploded top isometric view of a portion of the automated cooking system 100, according to one embodiment of the present subject matter. FIG. 3B shows an exploded side view of a portion of the automated cooking system 100, according to one embodiment of the present subject matter. FIGS. 3A-3B are discussed concurrently below. The automated cooking system 100 of FIGS. 3A-3B can be consistent with FIGS. 1A-2C; additional details are discussed with respect to FIGS. 3A-3B.

FIGS. 3A and 3B show that the collar 124 can include a flange 166 extending radially outward from an outer surface of the collar 124. The flange 166 can be used to mount the collar 124 to the top panel 136 at either the top surface 140 of the top panel 136 or an underside of the top panel 136.

FIGS. 3A and 3B also show a spindle seal 164, which can be configured to surround the spindle 152 to form a seal at the glass 150. The spindle seal 164 can also engage the housing (or support) 154 to form a secondary seal, as discussed below in further detail.

Also shown in FIGS. 3A and 3B are the components of an induction heater 149. The induction heater 149 can include a housing or support 154, a set of coils 170, and the glass 150. The housing 154 can support the coils 170 therein from below and can support the glass 150 thereon. The induction heater 149 can be secured to the collar 124 and/or the top panel 136. In some examples, the induction heater 149 can also be secured to a coil bracket 176, where an inner ring 172 and an outer ring 174 can be positioned between the coils 170 and the coil bracket 176 to form gaskets or seals therebetween. The coil bracket 176 can include flanges 178, which can be used to secure the coil support to the top panel 136 and/or the collar 124.

The motor mount 158 can be secured to a bottom side of the coil bracket 176 using motor mount flanges 180. The motor 160 can be secured to a bottom side of the motor mount 158 such that the shaft 162 extends through the motor mount 158. The shaft 162 can also extend through (or partially through) a coupler 182, which can also connect to the spindle 152. The coupler 182 can couple the spindle 152 to the motor shaft 162 such that the spindle 152 rotates with the shaft of the motor 162.

Figure 4:
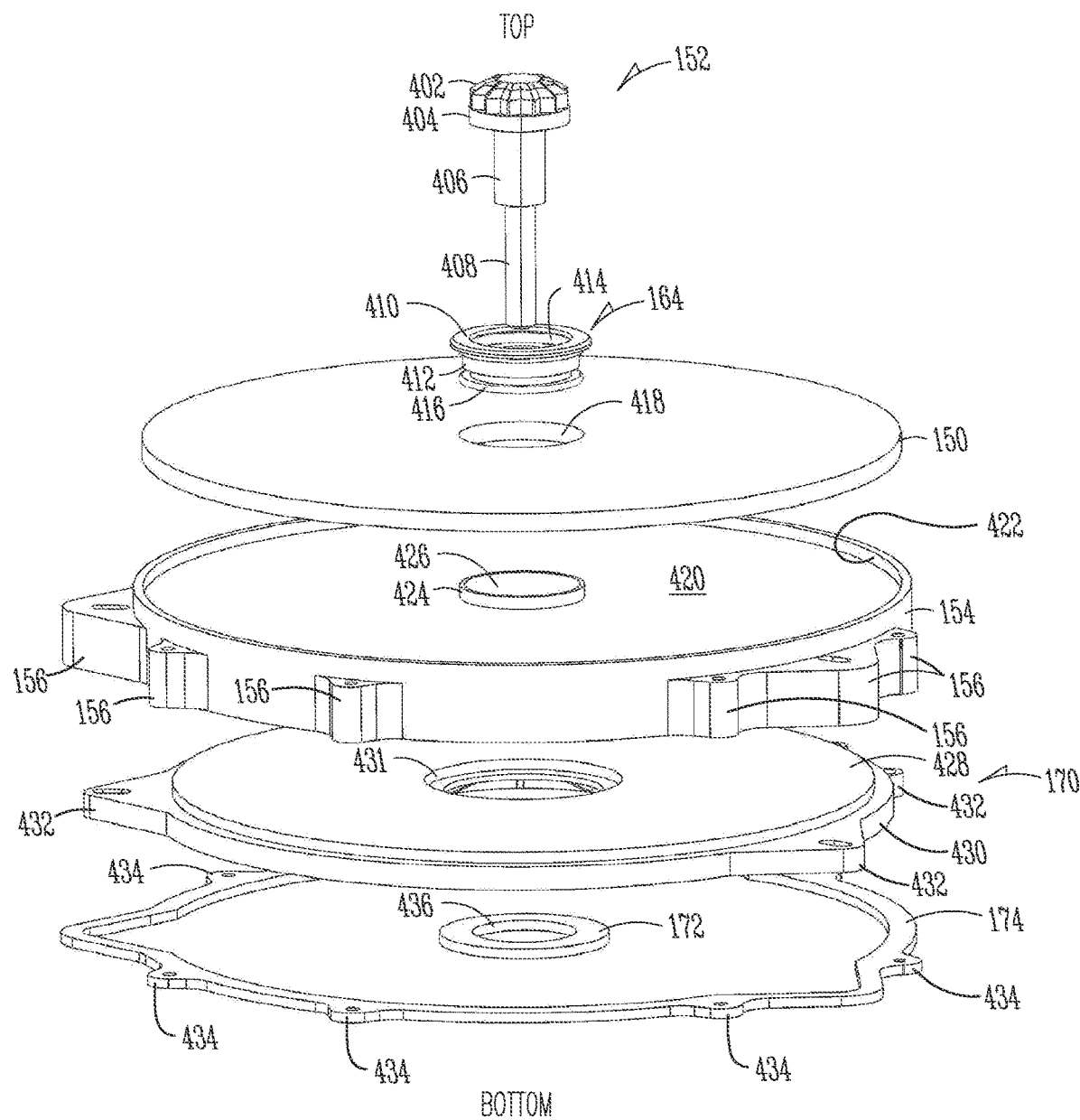
FIG. 4 shows an exploded side isometric view of a portion of an automated cooking system, according to one embodiment of the present subject matter.

FIG. 4 shows an exploded side isometric view of a portion of the automated cooking system 100, according to one embodiment of the present subject matter. The automated cooking system 100 of FIG. 4 can be consistent with FIGS. 1A-3B; additional details are discussed with respect to FIG. 3B.

FIG. 4 shows the spindle 152 in further detail. The spindle 152 can include an engagement portion 402, a seal portion 404, a support portion 406, and a coupling portion 408. The spindle 152 can be a rigid or semi-rigid body comprised of materials such as metals, plastics, ceramics, composites, or combinations thereof. In some examples, the spindle 152 can be made of metals resistant to heat and having a high strength and impact resistance for transferring torque from the motor shaft 162 to a mixer, such as steel and steel alloys. In some examples, the spindle 152 can be made of materials resistant to corrosion, such as stainless-steel alloys.

The engagement portion 402 can be supported by the seal portion 404 and can be configured to engage a mixer as discussed in FIGS. 8A and 8B below. The seal portion 404 can have a diameter larger than the support portion 406 and can be configured to engage the spindle seal 164 to help limit food and cooking fluids and gasses from escaping from the cooking vessel 104 or collar 124 into the induction heater 149. The support portion 406 can extend through the spindle seal 146 and can engage a bearing, as discussed in FIG. 5 below. The coupling portion 408 can have a reduced diameter for extending through the bearing and coupling to the shaft connector 182.

FIG. 4 also shows further details of the spindle seal 164, which can include a top portion 410, a medial portion 412, an inner portion 414, and a lower portion 416. The spindle seal 164 can be a seal or gasket engageable with the spindle and other components of the automated cooking system 100 to form one or more seals therein. The spindle seal 164 can be comprised of one or more of silicone, rubber, foams, other elastomers, or the like. The top portion 410 can be substantially flat or planar and configured to engage a portion of the cooking vessel 104 to form a seal at the cooking vessel. The top portion 410 can extend radially outward from the medial portion 412 to fully cover a bore 418 of the glass 150, where the medial portion 412 can extend into and engage the bore 418. The medial portion 418 can include multiple portions of different diameters to form seals at the glass 150 and the support 154. The lower portion 416 can extend radially outward from the medial portion 412 and can be configured to have an interference fit with a bore 424 of a boss 426 of the support 154.

The support 154, as shown in FIG. 4 can include a glass support surface 420, an outer support 422, a boss 424, and a boss bore 426. The support 154 can be a rigid or semi-rigid body comprised of materials such as metals, plastics, ceramics, composites, or combinations thereof. In some examples, the support 154 can be comprised of materials able to resist relatively high temperatures and unresponsive to induction from the coils 170, such as titanium, ceramics, high temperature plastics, or the like.

The boss 424 can extend upward from the surface 420 of the support 154 and can be generally circular or cylindrical, though other shapes can be used. Similarly, the outer support 422 can extend upward from a periphery of the surface 420 of the support 154 and can be generally circular or cylindrical, though other shapes can be used. The boss 424 can define the bore 426 extending through the support 154 from top to bottom. The boss 426 can be configured to extend into the bore 418 of the glass 150 and the glass can fit within the outer support 422 such that the surface 420 can engage a bottom surface of the glass 150 to provide substantially planar contact between the glass 150 and the support surface 420. The boss 426 and the outer support 422 can help limit radial movement of the glass 150 with respect to the housing 154. In some examples, a silicone or other adhesive can be applied between the glass 150 and the housing 154 to secure the glass 150 and the housing 154 while creating a seal therebetween.

The coils 170 can be supported by a coil support 430 which can be a rigid or semi-rigid body comprised of materials such as metals, plastics, ceramics, composites, or combinations thereof. In some examples, the coil support 430 can be comprised of materials able to resist relatively high temperatures and unresponsive to induction from the coils 170, such as titanium, ceramics, high temperature plastics, or the like. The coils 170 can be induction coils configured to transmit energy via induction to nearby ferrous materials (or other materials responsive to induction).

The inner ring 172 and the outer ring 174 can be seals or gaskets engageable with the coil support 430 to form seals between the coil support 430 and the coil bracket 176. The inner ring 172 and the outer ring 174 can be comprised of one or more of silicone, rubber, foams, other elastomers, or the like. The inner ring 172 can be sized to engage the coil support 430 adjacent a bore 431 of the coil support to form a seal around the spindle 152 and to support a radially inner portion of the housing 154. Similarly, the outer ring 174 can be sized to engage the coil support 430 near a periphery of the coil support 430 to form a seal around the periphery of the coil support 430 at the coil bracket 176.

The outer ring 174, the mounts 156, and coil mounts 432 of the coil support 430 can all be alignable to receive fasteners therethrough for securing the outer ring 174 to a bottom side of the coil mounts 432, the coil support 430 to the mounts 156 (via the coil support mounts 432), and the housing 154 to the top panel 136 and/or the collar 124.

Figure 5:
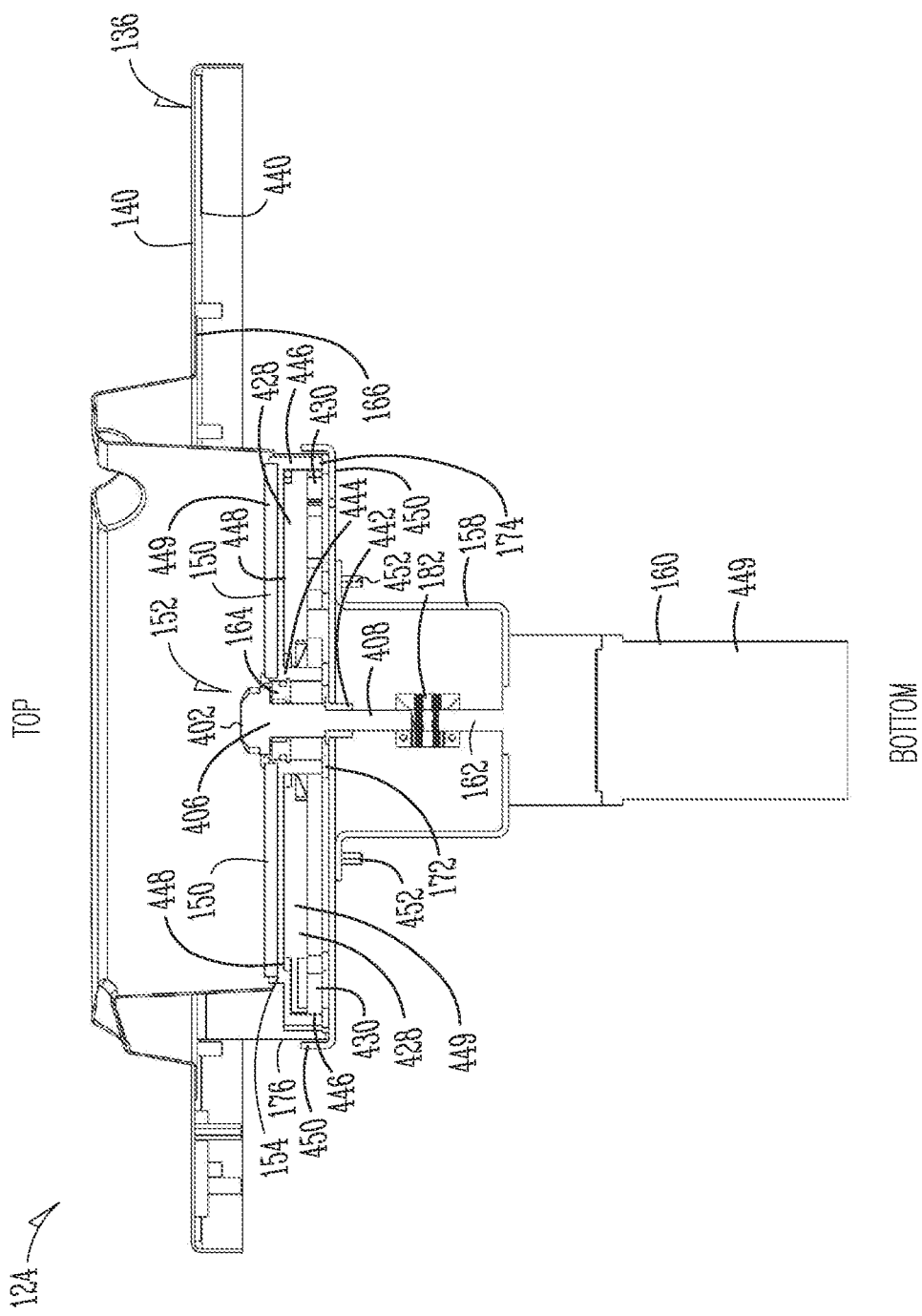
FIG. 5 shows side cross-sectional view of a portion of an automated cooking system, according to one embodiment of the present subject matter.

FIG. 5 shows a side cross-sectional view of a portion of the automated cooking system 100 across indicators 5-5 of FIG. 2C, according to one embodiment of the present subject matter. The automated cooking system 100 of FIG. 4 can be consistent with FIGS. 1A-4; additional details are discussed with respect to FIG. 5.

FIG. 5 shows that the top panel 136 can include a bottom surface 440 opposite the top surface 140. In some examples, the flange 166 of the collar 124 can be mounted or secured to the bottom surface 440 of the top panel 136. FIG. 5 also shows a bottom panel 450 of the coil bracket 176, which can have a central bore extending therethrough configured to receive a spindle bearing 442 through the bore. The spindle bearing 442 can help reduce non-rotational movement of the spindle 152 with respect to the collar 124 and the motor mount 158 to which the motor 160 is mounted.

Also shown in FIG. 5 are a housing radial inner support 444 and a housing radial outer support 446. The housing radial inner support 444 can be an inner wall or support of the coil housing 154 and can engage the inner seal 172 at a bottom portion of the housing radial inner support 444 to form an inner seal between the housing 154 and the bottom panel 450. Similarly, the housing radial outer support 446 can be an outer wall or support of the coil housing 154 and can engage the outer seal 174 at a bottom portion of the housing radial outer support 446 to form an outer seal between the housing 154 and the bottom panel 450.

The housing radial inner support 444, the housing radial outer support 446, and a top portion of the housing 154 can form a housing cavity 448 in which the coils 170 can be inserted to position the coils 170 adjacent the coil support surface 120 and the glass 150. Fasteners 452 can be screws, bolts, rivets, or the like, and can be used to secure the motor mount 158 to the bottom panel 450.

In some examples, the cooking system 100 can include one or more temperature sensors 449, which can be connected to the controller 116. As shown in FIG. 5, the temperature sensors 449 can be positioned within the housing 102 and can be connected to the glass 150, the coils 170, and the motor 160. The temperature sensors 449 can each be configured to produce a temperature signal based on a temperature of the component to which each of the temperature sensors 449 are connected. In other examples, the temperature sensors 449 can be positioned on other components. Each of the temperature sensors 449 can be a thermistor, thermocouple, resistance temperature detector, or the like.

In operation of some examples, the motor 160 can be operated to rotate the shaft 162. The coupling portion 408 of the spindle 152, being coupled to shaft 162, can spin with the shaft 162, which can rotate the engagement portion 402 of the spindle 152. The engagement portion 452 can drive a mixer of the cooking vessel 104 to mix food therein, as discussed in further detail below. Before, during, and/or after mixing of food, the induction coils 170 can deliver energy to the wok 126 of the cooking vessel 104 to heat the wok 126 and food therein.

During mixing and/or heating operations, the spindle seal 152 can help limit food, oils, and/or gasses from escaping from the cooking vessel 104 and into the housing 102 by forming seals at multiple points within the assemblies, as discussed above. The inner seal 172 and outer seal 174 can also help to limit food, oils, and/or gasses from escaping from the cooking vessel 104 and into the housing 102.

Figure 6A:
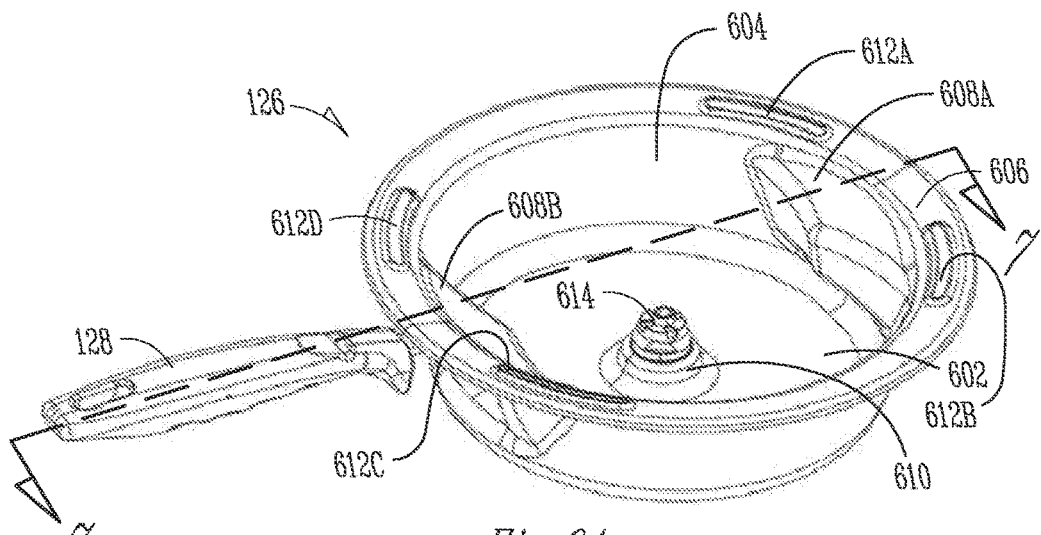
FIG. 6A shows an isometric view of a portion of an automated cooking system, according to one embodiment of the present subject matter.
Figure 6B:
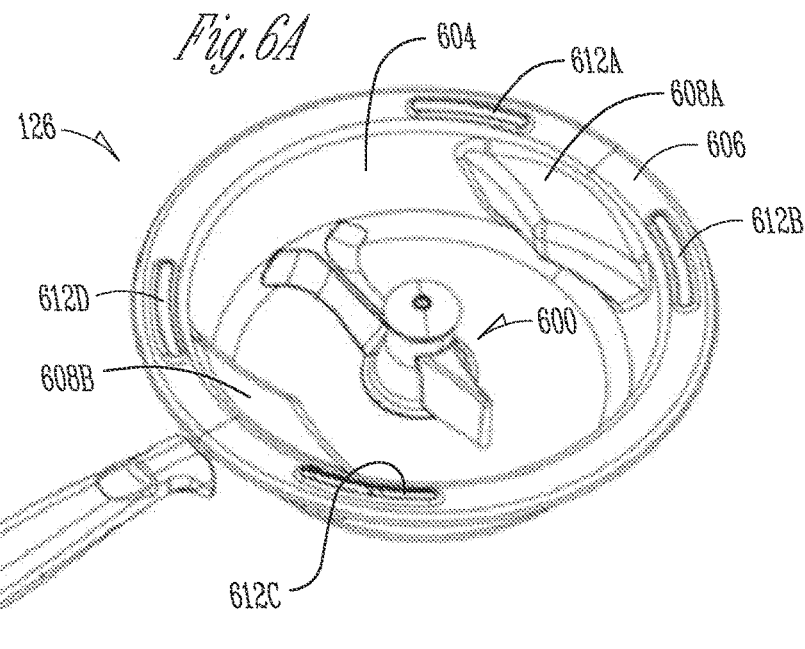
FIG. 6B shows an isometric view of a portion of an automated cooking system, according to one embodiment of the present subject matter.
Figure 6C:
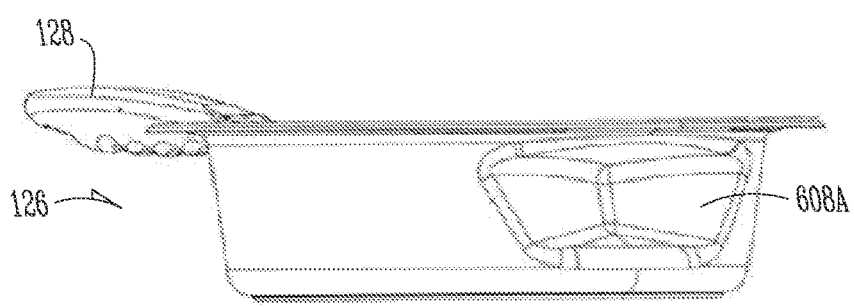
FIG. 6C shows a side view of a portion of an automated cooking system, according to one embodiment of the present subject matter.

FIG. 6A shows an isometric view of the cooking vessel 104 of the automated cooking system 100 with a mixer removed, according to one embodiment of the present subject matter. FIG. 6B shows an isometric view of the cooking vessel 104 of the automated cooking system 100 with the mixer installed, according to one embodiment of the present subject matter. FIG. 6C shows a side view of a portion of the automated cooking system 100, according to one embodiment of the present subject matter. FIGS. 6A-6C are discussed below concurrently.

FIGS. 6A-6C show details of the cooking vessel 104, including the wok 126 and the handle 128. Also shown in FIG. 6B is a mixer 600, which can be removably coupled to the wok 126 and rotatable therein to mix food and oil. In some examples, the mixer 600 can be driven to rotate in either direction by the motor 160 via the spindle 152, as discussed in further detail below.

The wok 126 can include a bottom portion 602, a side wall 604, an outer rim 606, deflectors 608a and 608b (collectively referred to as deflectors 608), and spindle collar 610.

The outer rim 606 can include rim ports 612a-612c (collectively referred to as the rim ports 612). Also shown is a mixer spindle 614.

The bottom portion 602 can be a rigid and substantially flat or planar portion connected to the side wall 604 at a periphery of the bottom portion. The side wall 604 can extend upward therefrom and can partially form the deflectors 608, which can terminate before the outer rim 606. The outer rim 606 can extend radially outward from the side wall 604 and can include the rim ports 612a-612c extending therethrough. The rim ports 612a-612c can be alignable with the ports 144 of the collar 124 such that the rim ports 612 can receive air therethrough for delivery of hot air (or fluid) into the cooking vessel 104 for convective heating of food within the cooking vessel 104.

The deflectors 608 can extend radially inward from the side wall 604 and can have geometric shape of a triangle with curved segments from a top perspective, but can have other shapes in other examples. From a three-dimensional perspective, the deflector 608 can have a shape of a curved triangular prism extending from the wall 604. The deflector 608 can be spaced from the bottom portion 602 such that the mixer 600 can pass between the deflectors 608 and the bottom portion, which can allow the deflectors 608 to scrape food from the mixer 600 during rotation of the mixer 600. FIG. 6C shows how the deflectors 608 can be formed from the sidewall 604 such that the sidewall 604 is a single piece, which can help increase food containment during cooking operations. Operation of the mixer 600 is discussed below in further detail.

The spindle collar 610 can be a raised portion of the bottom portion 602, which can be substantially in the center of the bottom portion 602 and can be configured to support the mixer spindle 614 therein and therethrough. The mixer spindle 614 can be coupled to the spindle 152, as discussed below in further detail, and can be coupled to the mixer 600 to drive the mixer 600 to rotate within the wok 126 adjacent the bottom surface 602.

FIG. 7A shows a side cross-sectional view across indicators 7-7 of FIG. 6A of a cooking vessel 104 of an automated cooking system with a mixer 600 removed, according to one embodiment of the present subject matter. FIG. 7B shows a side cross-sectional view across indicators 7-7 of FIG. 6A of the cooking vessel 104 of an automated cooking system with the mixer 600 installed, according to one embodiment of the present subject matter. FIGS. 7A and 7B are discussed below concurrently. The cooking vessel 104 of FIGS. 7A and 7B can be consistent with FIGS. 1A-6B; additional details are discussed with respect to FIGS. 7A and 7B.

For example, the handle 128 can include a grip 702, which can be comprised of an insulative material such as plastic. The handle 128 can also include a tang 704, which can be a rigid or semi-rigid member comprised of materials such as metals, plastics, or the like. The tang 704 can extend into the grip 702 and can be coupled to the wok 126 using fasteners 706, which can be screws, bolts, rivets, or the like. The grip 702 can also include a bore 708, which can be used to hang the cooking vessel (for example for drying) and a gripping portion 710, which can be ergonomically shaped for holding of the grip 702 with a hand.

FIGS. 7A and 7B also show details of the mixer 600, the deflectors 608, and the mixer spindle 614. The deflectors 608a and 608b can be comprised of portions of the wall 604 extending radially inward toward a center of the wok 126. Each of the deflectors 608 can be formed of three main portions from the perspective of FIGS. 7A and 7B, a top portion 724, a medial portion 726, and a bottom portion 728.

The top portion 724 can extend radially inward from the side wall 604 and can be angled downward to help contain food and liquids within the cooking vessel 104 during cooking operations. The bottom portion 728 can extend radially inward from the side wall 604 and can be angled upward toward the top portion 724. The medial portion can extend from the bottom portion 728 to the top portion 724 and can be angled upward. The angle of the bottom portion 728 can create a gap G between the blade 712 and the deflector sized such that the bottom portion 728 of the deflector 608 can engage food particles and/or fluids that are on top of the blade 712 to promote mixing and flipping of the food within the cooking vessel during mixing operations. The medial portion 726 can also engage food particles and/or fluids that are on top of the blade 712 to promote mixing and flipping of the food within the cooking vessel during mixing operations.

The mixer 600 can include a blade 712, a paddle 714, a hub 716, a cap 718, teeth 720, and a recess 721. The cap 718 can include a coupler 722. The hub 716 can be at a rotational center of the blade 600 and can be configured to connect to the mixer spindle 614.

The blade 712 and the paddle 714 can extend radially outward from the hub 716. The blade 712 can extend to the wall 604 of the wok 126, and can contact the wall 604, in some examples, at a tip of the blade 712. In other examples, the blade 712 may not contact the wall 604. The blade 712 can have a length such that the wall 604 of the of the cooking vessel 104 can be of a relatively short distance d2 from a tip or leading edge of the blade 712, which can allow the blade to scrape food from an inner surface of the wall 604. The paddle 714 can extend radially outward from the hub, stopping short of the wall 604 at a distance d1, which can be relatively larger than the distance d2, which can allow the paddle 714 to break down relatively larger portions of food adhered in a group (bunches of food).

The mixer 600 can be coupled to the wok 126 at the spindle collar 610. The spindle collar 610 can extend upward from the bottom portion 602 of the wok 126 and can form a substantially conical platform with a bore extending therethrough. The bore can be sized to receive and retain the mixer spindle 614, as discussed in further detail with respect to FIGS. 8A-9B.

The mixer spindle 614 can include a body 729, projections 730, a coupling bore 732, and one or more locking bores 734, which can be smaller diameter bores coaxial with the coupling bore 732. The coupling bore 732 can extend into the body 729 from a top side of the mixer spindle 614 and can reduce down to one or more locking bores 734. The projections 730 can extend upward from the body 729.

The mixer 600 can be placed on the mixer spindle 614 such that the recess 721 of the mixer 600 covers the mixer spindle 614 causing the teeth 720 of the mixer 600 to engage the projections 730 of the mixer spindle 614. This engagement can allow transfer of forces between the teeth 720 and the projections 730, which can allow the mixer spindle 614 to drive the mixer 600 to rotate therewith. The connection between the mixer 600 and the mixer spindle 614 can be secured using the cap 718.

Once the teeth 720 of the mixer 600 engage the projections 730 of the mixer spindle 614, the coupler 722 can be inserted into the mixer 600 such that the coupler 722 can extend into the coupling bore 732. In some examples, the coupler 722 can include a projection (such as a biased ball bearing) which can engage one or more of the locking bores 734, creating an interference fit between the coupler 722 and the locking bores 734. This engagement between the coupler 722 and the locking bores 734 can limit upward movement of the mixer 600 from the mixing spindle 614, helping to keep the mixer 600 engaged with the mixing spindle 614 during mixing and heating operations of the automated cooking system 100. The coupler 722 can be released from the coupler bore 732 (and the locking bore 734) by actuating a control, such as a button, which can be positioned at a top portion of the coupler 722. Such actuation can release engagement of the coupler 722 with the coupler bore 732 so that the coupler 722 can be removed from the bore 732, allowing the mixer 600 to be disengaged from the spindle 614 for cleaning and/or repair. The cap 718 can engage the mixer 600 to cover and protect the coupler 722 and the coupler bore 732. The cap 718 can be a flexible material in some examples, such as one or more of a plastic, silicone, or the like. Further details of the components of the mixer 600 are discussed below with respect to FIGS. 10A-10G.

FIG. 8A shows a bottom isometric view of the cooking vessel 104 of an automated cooking system, according to one embodiment of the present subject matter. FIG. 8B shows a bottom isometric view of the cooking vessel 104 of an automated cooking system, according to one embodiment of the present subject matter. FIGS. 8A and 8B are discussed below concurrently. The cooking vessel 104 of FIGS. 8A and 8B can be consistent with FIGS. 1A-7B; FIGS. 8A and 8B show how the spindle 152 can engage the mixer spindle 614.

The collar 610 of the wok 126 can create a recess or bore 810 on an underside of the wok 126 from which a coupler 804 of the mixing spindle 614 can extend downward. The coupler 804 can include a bore 806 therein, which can have a star shape in some examples. The bore 806 can have other shapes, such as hex, hexolubular, or the like. In some examples, the bore 806 can be a 16-tooth star bore. In any example, the bore 806 can be shaped complimentarily to the engagement portion 402 such that teeth 808 of the engagement portions can be configured to engage recesses of the bore 806 for transfer of forces between the engagement portion 802 and the mixing spindle 614, allowing the spindle 152 to drive the mixing spindle 614 to rotate with respect to the bottom portion 602 of the wok 126.

FIG. 9A shows a side cross-sectional view across indicators 9-9 of FIG. 8A of a cooking vessel of an automated cooking system, according to one embodiment of the present subject matter. FIG. 9B shows an isometric cross-sectional view across indicators 9-9 of FIG. 8A of a cooking vessel of an automated cooking system, according to one embodiment of the present subject matter. The cooking vessel 104 of FIGS. 9A and 9B can be consistent with FIGS. 1A-8B; FIGS. 9A and 9B show how the construction of the bottom of the cooking vessel and how the spindle 152 engages the mixing spindle 614.

The wok 126 of the cooking vessel 104 can include the bottom portion 602, as discussed above, which can be substantially planar member connected to the wall 604. A contact portion 902 can be positioned below the bottom portion 602 and can be secured to the bottom portion 902. A heat spreader 904 can be located between the bottom portion 602 and the contact portion 902.

The bottom portion 602 and the contact portion 902 can be made of a ferrous material (such as a stainless steel) configured to heat up in response to induction from the set of coils 170. The heat spreader 904 can be made of a material having a relatively high thermal conductivity, such as one or more of silver, aluminum, gold, copper, alloys thereof, or the like. The heat spreader 904 can contact both the contact portion 902 and the bottom portion 602. The heat spreader 904 can thereby be configured to transfer heat from the contact portion 902 to the bottom portion 602 and can help to equally distribute heat throughout the bottom portion 602 of the cooking vessel 104 during cooking operations, which can help avoid hot spots in the bottom portion, helping to reduce burning of food therein. The three-layer assembly of the bottom portion 602, the heat spreader 904, and the contact portion 902 can help to mimic a sauté effect of the wok 126 during cooking operations.

FIGS. 9A and 9B also show additional details of how the spindle 152 engages the mixing spindle 614. For example, FIGS. 9A and 9B show the engagement portion 402 of the spindle 152 can be inserted into the bore 806 of the coupler 804 until the seal portion 404 contacts a body 906 of the coupler 804, which can help to ensure engagement between the teeth 808 of the spindle 152 and the bore 806.

FIG. 9B also shows additional details of the projections 730 of the mixing spindle 614, which can be circumferentially spaced projections around a top portion of the spindle that extend radially outward from the coupling bore 732. FIG. 9B further shows a top bearing 908 and a bottom bearing 910 of the mixing spindle 614, which can engage the collar 610 from respective top and bottom sides to retain the mixing spindle 614 on the collar 610 and can provide a rotational bearing therefore. The top bearing 908 and the bottom bearing 910 can be secured together through a threaded interface in some examples, and can be secured in other ways in other examples, such as by using fasteners, adhesive, or the like.

Figure 10A:
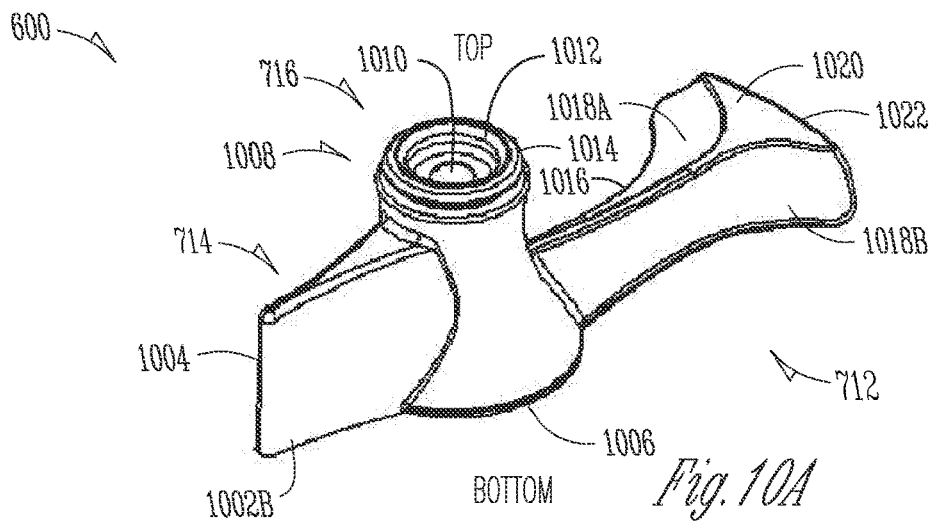
FIG. 10A shows an isometric view of a mixer of an automated cooking system, according to one embodiment of the present subject matter.
Figure 10B:
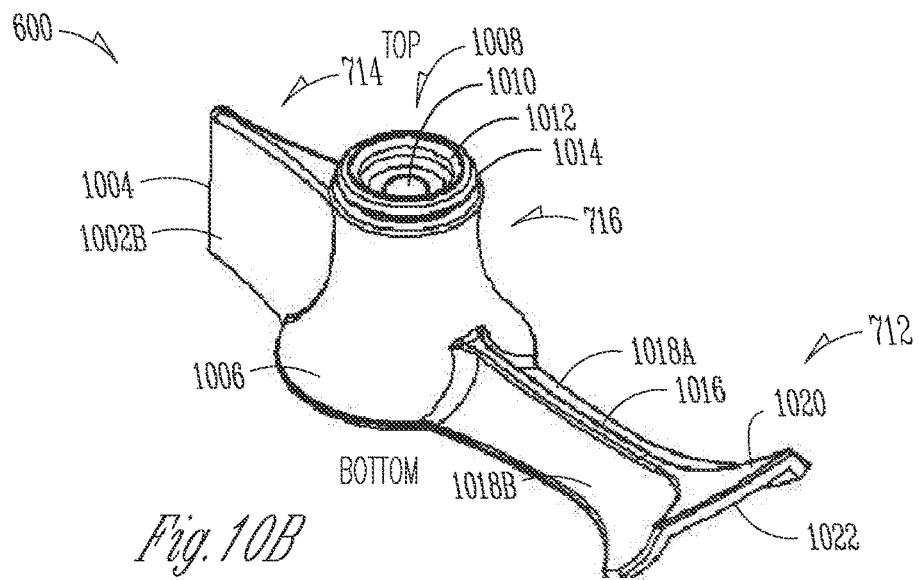
FIG. 10B shows an isometric view of a mixer of an automated cooking system, according to one embodiment of the present subject matter.
Figure 10C:
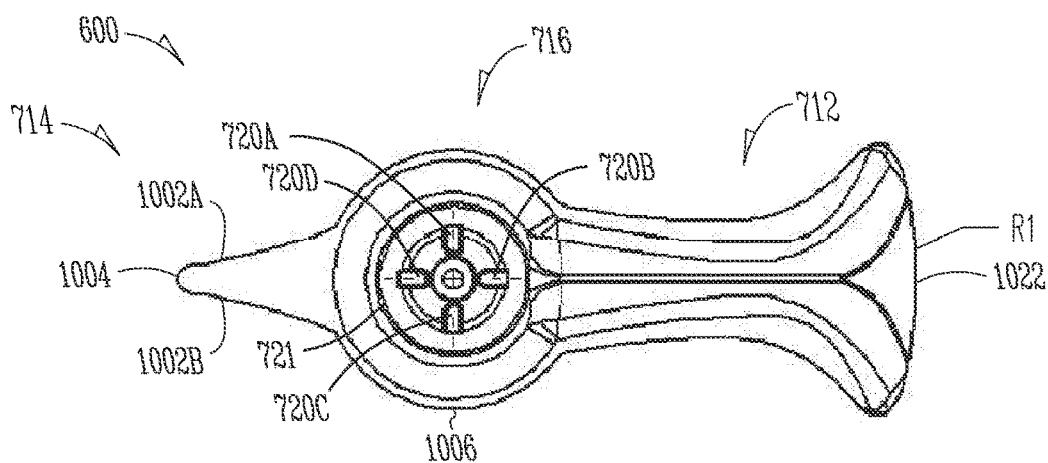
FIG. 10C shows a bottom view of a mixer of an automated cooking system, according to one embodiment of the present subject matter.

FIG. 10A shows an isometric view of the mixer 600 of an automated cooking system, according to one embodiment of the present subject matter. FIG. 10B shows an isometric view of the mixer 600 of an automated cooking system, according to one embodiment of the present subject matter. FIG. 10C shows a bottom view of the mixer 600 of an automated cooking system, according to one embodiment of the present subject matter. FIG. 10D shows a side view of the mixer 600 of an automated cooking system, according to one embodiment of the present subject matter. FIG. 10E shows a top view of the mixer 600 of an automated cooking system, according to one embodiment of the present subject matter. FIG. 10F shows a rear view of the mixer 600 of an automated cooking system, according to one embodiment of the present subject matter. FIG. 10G shows a cross-sectional view of the mixer 600 of an automated cooking system across indicators 10G-10G of FIG. 10F, according to one embodiment of the present subject matter. FIGS. 10A-10G are discussed below concurrently. The mixer 600 can be consistent with the mixer 600 of FIGS. 6B-9B; additional details of the mixer are discussed with respect to FIGS. 10A-10G.

As discussed in the FIGS. above, the mixer 600 can include the paddle 714, the blade 712, and the hub 716. The hub 716 can include a recess 721 which can include teeth 720a-720d therein. The paddle 714 can include edges 1002a and 1002b, and a tip 1004.

The mixer 600 can be a rigid or semi-rigid body comprised of materials such as metals, plastics, foams, elastomers, ceramics, composites, or combinations thereof. In some examples, the mixer 600 can be made of metals resistant to heat, such as steel and steel alloys. In some examples, the mixer 600 can be monolithically formed, such as by casting, machining, and/or three-dimensional printing. In other examples, the mixer 600 can be comprised of multiple components connected to each other. The mixer 600 can be symmetric about a transverse axis of the mixer 600 and can be asymmetric about a longitudinal axis of the mixer 600.

As discussed above, the paddle 714 can extend radially outward from a base 1006 of the hub 716. The edges 1002 of the paddle can extend outward and toward each other and can terminate at the tip 1004, which can be rounded in some examples. The edges 1002a and 1002b can be substantially swept upward, as shown in FIG. 10E, as the edges 1002 extend from a bottom of the paddle 714 to a top of the paddle 714, which can help to turn food over as the paddle 714 contacts food within the cooking vessel 104 during rotation of the mixer 600.

The hub 716 can include a base 1006 including the recess 721 and a top portion 1008. The top portion 1008 can include a stem bore 1010, a cap bore 1012, and a lip 1014. The top portion 1008 can have a diameter smaller than the base 1006 such that the hub 716 can narrow diametrically as the hub 716 extends upward. The stem bore 1010 can be configured to receive the coupler 722 therein and therethrough for coupling of the coupler 722 to the mixing spindle 614. The cap bore 1012 can be a bore extending from a top of the top portion 1008 downward into the hub 716 and can be configured to receive a portion of the cap 718 therein to help secure the cap 718 to the hub 716. The lip 1014 can extend radially outward from the top portion 1008 and can be configured to engage an outer portion (719 of FIG. 7B) of the cap 718 to further secure the cap 718 to the hub 716.

The blade 712 can include a spine 1016, edges 1018a and 1018b, a platform 1020, and a distal edge 1022. Each of the edges 1018a and 1018b can include wings 1024a and 1024b, respectively. The edge 1022 can include a recessed portion 1026. FIGS. 10A-10G also show radii of curvatures R1-R6.

The spine 1016 can be a top portion of the blade 712 extending radially outward from the hub 716 and connecting the edges 1018a and 1018b. The spine 1016 can be flared outward at the wings 1024a and 1024b to create the platform 1020 near the edge 1022. The edges 1018a and 1018b can also extend radially outward from the hub 716 but can have a relatively small thickness away from the spine 1016 and can be upward swept toward the spine 1016. In some examples, the edge 1018a can have a radius of curvature R2 and the edge 1018b can have a radius of curvature R3. The radii of curvature R2 and R3 can be between 180 and 380 millimeters (mm). In some examples, the radii of curvature R2 and R3 can be between 260 and 300 mm. In some examples, the radii of curvature R2 and R3 can be about 280 mm. In some examples, the radii of curvature R2 and R3 can be the same for a similar mixing effect on food during mixing in both directions; however, in other examples, the radii of curvature R2 and R3 can be different to, for example, vary an effect on food within the wok 126 depending on the rotational direction of the mixer 600.

As the edges 1018a and 1018b extend radially outward, the edges 1018a and 1018b can flare into include wings 1024a and 1024b, respectively. The radii of curvature between the edges 1018a and 1018b and their respective wings 1024a and 1024b can be R5 and R6, respectively. The radii of curvature R5 and R6 can be between 20 and 60 mm in some examples and can be between 30 and 50 mm in other examples. In some examples, the radii of curvature R5 and R6 can be 40 mm.

The wings 1024a and 1024b of the edges 1018a and 1018b can terminate distally at the distal edge 1022, which can be configured to engage the wall 604 of the wok 126, as discussed above. To accommodate such contact, the distal edge 1022 can have a radius of curvature R1, which can be configured to match a radius of curvature of the wall 604 and can be between 75 and 160 mm. In some examples, the radius of curvature R1 can be between 115 and 125 mm. In some examples, the radius of curvature R1 can be 117 mm. The edge 1022 can include the recessed portion 1026, which can be diametrically smaller than the edge 1022 to limit a portion of the edge 1022 that contacts the wall 604 during mixing operations, to help reduce friction between the mixer 600 and the wall 604. The spine 1016 can also be curved at a radius of curvature R4. In some examples, spine 1016 can have a radius of curvature R4 between 180 and 380 millimeters (mm). In some examples, the radius of curvature R4 can be between 260 and 300 mm. In some examples, the radius of curvature R4 can be about 280 mm.

FIG. 10C also shows teeth 720a-720d, which can extend downward from the hub 716 within the recess 721. In some examples, there can be four of the teeth 720. In other examples, there can be more or less teeth, such as 1, 2, 3, 5, 6, 7, 8, 9, 10, 15, 20, or the like teeth. The teeth can be shaped to engage the projections 730, as discussed above, and can be spaced such that the teeth 720 can engage the projections 730 of the mixer 600 in multiple orientations of the mixer 600 with respect to the mixing spindle 614, to make securing of the mixer 600 to the mixing spindle 614 faster and easier.

Figure 11B:
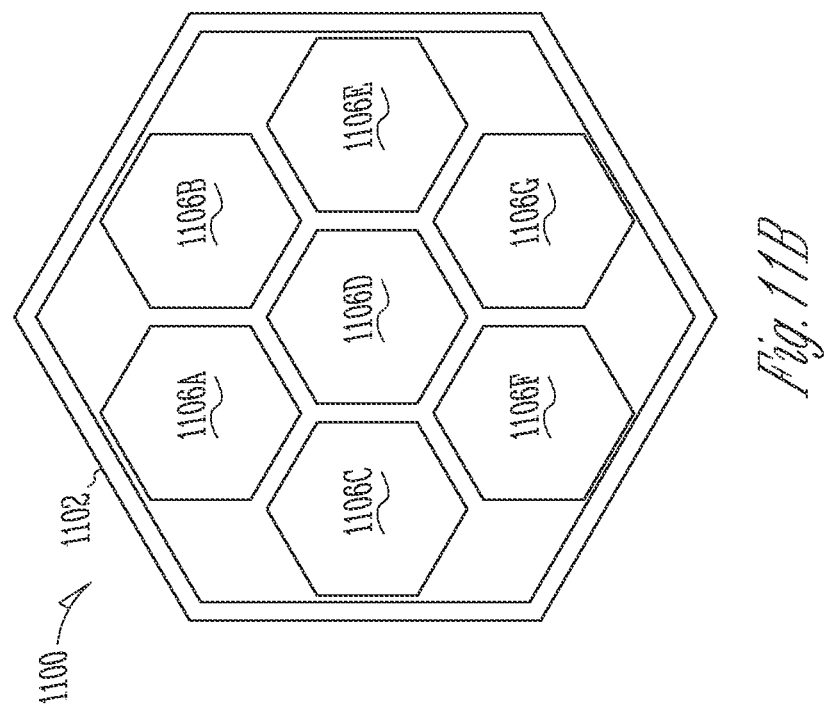
FIG. 11B shows a top view of a plurality of food containers, according to one embodiment of the present subject matter.
Figure 11A:
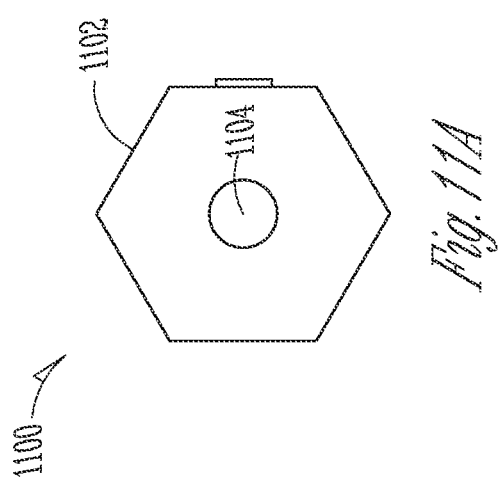
FIG. 11A shows a top view of a food container, according to one embodiment of the present subject matter.

FIG. 11A shows atop view of a food container 1100, according to one embodiment of the present subject matter. FIG. 11B shows a top view of the food container 1100, according to one embodiment of the present subject matter. FIGS. 11A and 11B are discussed below concurrently.

The container 1100 can include walls 1102 and a secondary lid 1104. The walls 1102 can be comprised of rigid or semi-rigid materials, such as foams, paper-products, plastics, or the like. In some examples, the walls 1102 can be comprised of common recyclable materials, such as cardboard. The secondary lid 1104 can be sized and shaped to retain one or more wrapped baked goods (such as fortune cookies) therein.

FIG. 11B shows the container 1100 with food containers 1106a-1106g positioned therein. In some examples, each of the food containers 1106a-1106b can be hexagonal in shape from a top perspective, allowing the food containers 1106a-1106b to be arranged in the container 1100 between the walls 1102 such that each of the food containers 1106a-1106b is supported by at least four items (food containers 1106a-1106b and/or walls 1102). In some examples, the container 1100 can also be hexagonal to promote such an arrangement of the food containers 1106a-1106b within the container 1100. Though the container 1100 and the food containers 1106a-1106b are discussed as being hexagonal, the container 1100 and the food containers 1106a-1106b can be other shapes such as octagonal, rectangular, or the like.

In some examples, each of the food containers 1106a-1106b can include couplers on an outside of each wall so that the food containers 1106a-1106b can be connected to each other to help prevent spills during transportation of the food containers 1106a-1106b and the container 1100.

Figure 12:
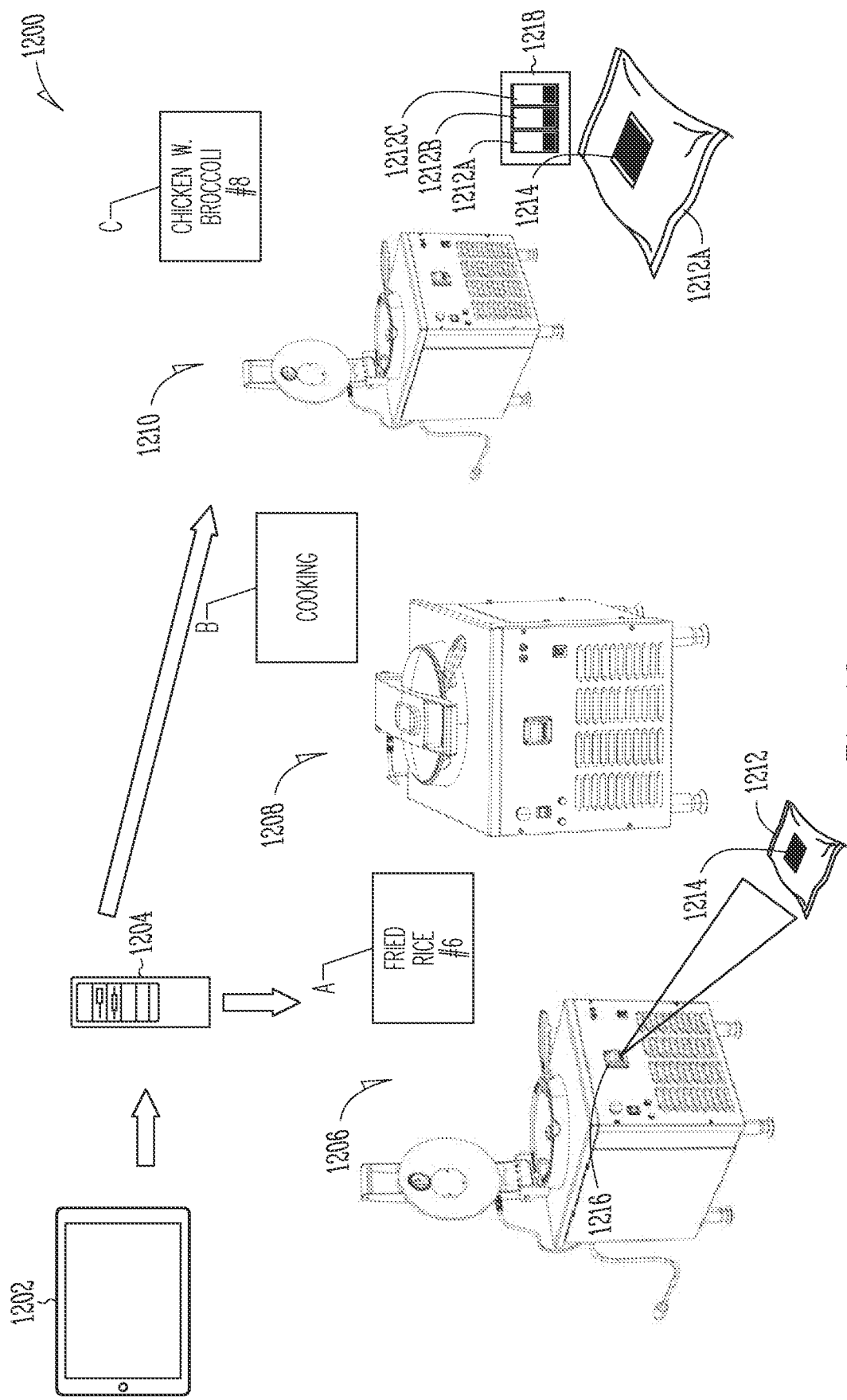
FIG. 12 shows a diagram of an automated cooking system, according to one embodiment of the present subject matter.

FIG. 12 shows a diagram of an automated cooking system 1200, according to one embodiment of the present subject matter. The automated cooking system 1200 can include a point of sale device 1202, an intermediate system 1204, a first automated cooker 1206, a second automated cooker 1208, and a third automated cooker 1210. Also shown in FIG. 12 are food items 1212a-1212c, which can each have a code 1214 thereon. Each of the automated cookers 1206-1210 can include a scan sensor 1216. Further shown in FIG. 12 is storage container 1218 and cooking operations A, B, and C.

The point of sale device (POS) 1202 can be a device including a user interface operable by customers and/or employees of a restaurant, mobile food operation, or business. The intermediate system 1204 can be a remote computing device or system located within the restaurant or can be located remotely. The intermediate system 1204 can be in communication with the point of sale device 1202 through a wired and/or wireless connection. Both the intermediate system 1204 and the point of sale device 1202 can be a computer or computer system, as discussed below in FIG. 17.

The first automated cooker 1206, the second automated cooker 1208, and the third automated cooker 1210 can each be automated cooking systems or devices consistent with FIGS. 1A-10G, discussed above. Each of the first automated cooker 1206, the second automated cooker 1208, and the third automated cooker 1210 can include a controller and a communication device therein for processing of information and communication with the intermediate system 1204 and/or the point of sale device 1202. The controller within each of the first automated cooker 1206, the second automated cooker 1208, and the third automated cooker 1210 can be a computer or computer system, as discussed below in FIG. 17.

The food items 1212a-1212c can each be packages of food or other ingredients, such as oils, spices, sauces, or the like. The packages can be individually sealed and can be in measured portions for combination with other of the food items 1212a-1212c to create a dish or order of food.

Each of the food items 1212a-1212c can have the code 1214 thereon. The code 1214 can be a bar code, a QR code, a radio-frequency identification (RFID) tag, or other visual, optical, or electromagnetic identification device configured to interact with the scan sensor 1216 of each of the first automated cooker 1206, the second automated cooker 1208, and the third automated cooker 1210.

The scan sensor 1216 can be an optical scanner or sensor connected to each of the automated cookers 1206-1210. The scan sensor 1216 can be configured to read codes, such as bar codes and/or QR codes. In some examples, the sensor 1216 can be communicative sensors such as electromagnetic sensors (for example, a near field communication (NFC) sensor). The scan sensor 1216 can be electrically connected to a controller located within any of the automated cookers 1206-1210. The sensor 116 can be configured to produce a scan signal based on a scan of a package or item.

The storage container 1218 can be a refrigerator, freezer, dry storage, or other container configured to store the food items 1212a-1212c for a long, medium, or short term. In some examples, the storage container 1218 can be in communication with the intermediate system 1204 and/or the point of sale device 1202, as discussed in FIG. 13 below.

In operation of some examples, a user can select an order at the POS device 1202, which can be transmitted to the intermediate system 1204. The intermediate system 1204 can communicate with each of the automated cookers 1206-1210 to determine which if any of the automated cookers 1206-1210 are available to complete the order. When no cookers are available, the intermediate system 1204 can create a queue or list of orders requiring assignment to one of the automated cookers 1206-1210. The intermediate system 1204 can then assign orders of the queue based on one or more parameters such as a duration in the queue of each order and a time required to complete each order. When cookers are available, the intermediate system 1204 can assign an order to a cooker.

In the example shown in FIG. 12, the second automated cooker 1208 can be performing the cooking operation B, and can be therefore unavailable to perform an operation for a new order. The order can then be assigned to, for example, the first automated cooker 1206 where the order is fried rice (#6). The automated cooker 1206 may then be unavailable for a cooking operation until the fried rice (#6) A is complete. Another order can be received by the POS device 1202, which can be transmitted to the intermediate system 1204. The intermediate system 1204 can communicate with each of the automated cookers 1206-1210 to determine which if any of the automated cookers 1206-1210 are available to complete the order. Because the first automated cooker 1206 is performing the cooking operation A and the second automated cooker 1208 is performing the cooking operation B, the intermediate system 1204 can assign the order to the third automated cooker 1210. The third automated cooker 1210 can then perform the cooking operation C, chicken with broccoli, #8.

During the cooking operation A, food items 1212 can be loaded into a cooking vessel of the automated cooker 1206 (such as the cooking vessel 104) and the automated cooker 1206 can perform heating and mixing operations to cook the food items to complete the order. During loading of the food items 1212 into the cooking vessel, each of the food items 1212 can be scanned as they are loaded into the automated cooker 1206 at the scan sensor 1216. For example, the code 1214 of each food item 1212 can be scanned by the scan sensor 1216, which can produce a scan signal that can be transmitted to a controller within the automated cooker 1206 and/or the intermediate system 1204.

The controller can receive the scan signal and can determine whether the food item 1202 is the correct food item for the cooking operation A (fried rice #6). If, for example, the food item 1202 is incorrect, the controller can produce an alert that can be transmitted to the intermediate system 1204 to alert an operator. Similarly, the controller can enable one or more indicators (such as a light or speaker) on the automated cooker 1206 to indicate to the operator that the food item 1202 is incorrect. Further, the controller can prevent cooking operations from proceeding when the food item 1202 is incorrect.

When the food item 1202 is correct, cooking operations can proceed. When the controller determines that all of the food items 1202 have been received, heating and mixing operations of the automated cooker 1206 can begin. In some examples, as discussed in further detail below with respect to FIGS. 14-17, the controller can adjust the cooking operations based on the order and/or the food item 1202 as indicated by the scan signal received from the scan sensor 1216. When the cooking operation is complete the automated cooker 1206 can produce an alert transmittable to the POS 1202, the intermediate system 1204, and/or can produce an audio or visual alert to notify an operator or user that the operation is complete. Such an alert sent to the POS can indicate that the order is ready for pick up and/or delivery.

In some examples, the intermediate system 1204 can be omitted and one or more POS devices can select and monitor the first automated cookers 1206-1210. In other examples, the intermediate system 1204 can update cooking and assignment algorithms that can be distributed to each of the automated cookers 1206-1210. The intermediate system 1204 can also transmit updates to other controllers and/or intermediate computer systems at different locations to help centralize preparation procedures, improving food consistency and quality.

Figure 13:
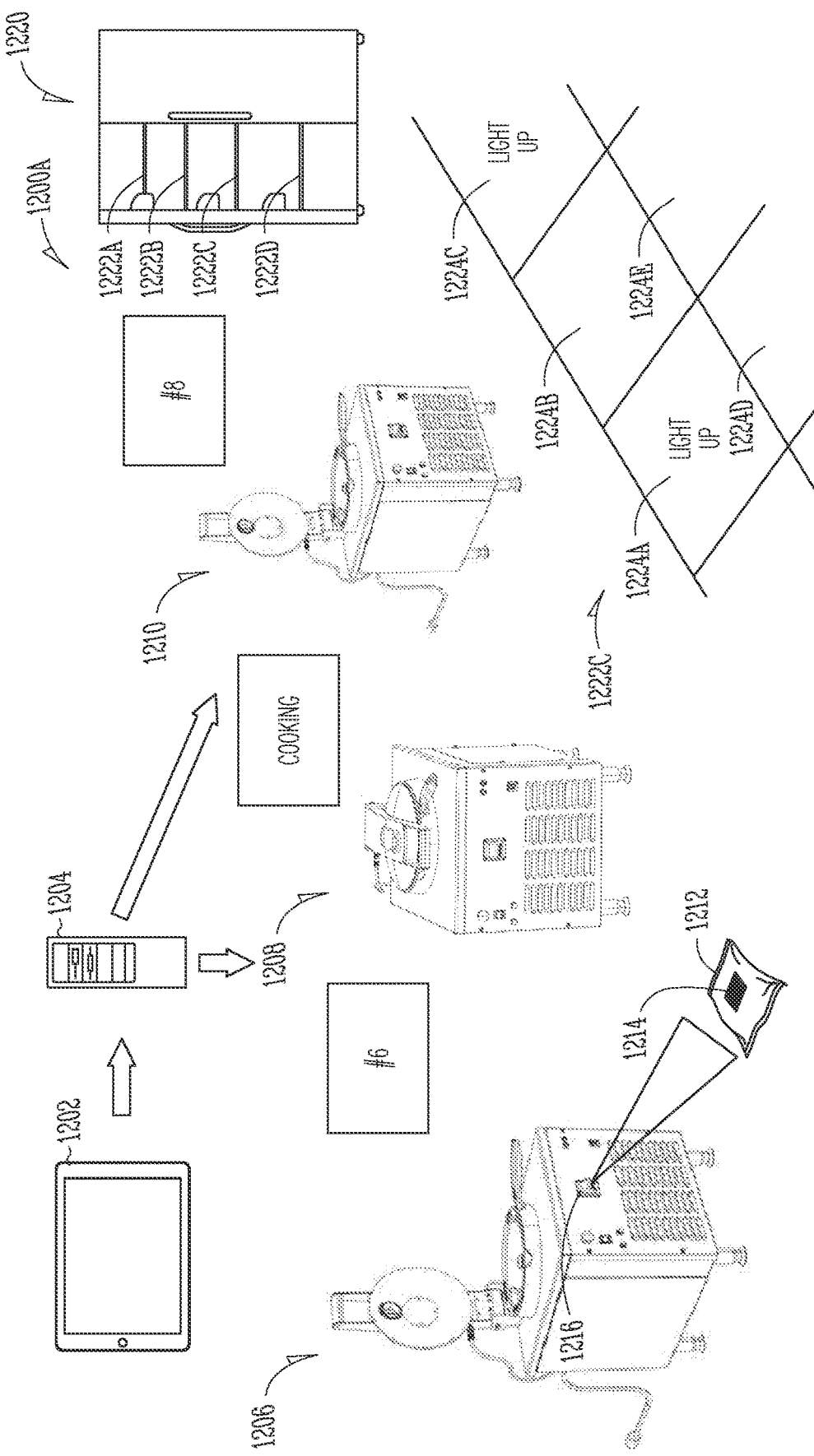
FIG. 13 shows a diagram of an automated cooking system, according to one embodiment of the present subject matter.

FIG. 13 shows a diagram of an automated cooking system 1200A, according to one embodiment of the present subject matter. The automated cooking system 1200A can be consistent with the automated cooking system 1200 of FIG. 12, but the automated cooking system 1200A can include storage container 1220.

The storage container 1220 can be configured to store food items, similar to the storage container 1218. However, the storage container 1220 can include one or more shelves 1222a-1222d, where each of the shelves 1222a-1222d can be configured to indicate which food products should be selected by a user or operator. In some examples, the storage container 1220 can be in communication with a controller of each of the automated cookers 1206-1210, the POS device 1202, and/or the intermediate system 1204.

In operation, when an order is received by the POS device 1202, the order is communicated to the intermediate device 1204 and/or the automated cookers 1206-1210. The POS device 1202, the intermediate device 1204, and/or the automated cookers 1206-1210 can transmit to the storage container 1220 the order received at the POS device 1202 or the food items required to create the order. In some examples, the storage container 1220 can determine the required food items based on the order.

Once the food items required to fill the order are known by the storage container 1220, the storage container 1220 can produce an indication to an operator which items are to be selected. For example, the storage container 1220 can indicate at which shelf and which compartment a food item is to be selected from. For example, when order #6 is received at the automated cooker 1206, the storage container 1220 can illuminate lights of compartments 1224a and 1224c of the shelf 1222c, where the compartments 1224b, 1224d, and 1224e can remain un-illuminated.

In some examples, the compartments 1224a-1224e can include multiple lights configured to emit multiple indication colors based on the automated cookers to which the order is associate and/or based on the food item within the compartment. In one example, a different color can be associated with each of the automated cooker 1206-1210.

FIG. 14 shows a flow chart of a method 1400 of operating an automated cooking system, according to one embodiment of the present subject matter. The steps or operations of the method 1400 are illustrated in a particular order for convenience and clarity; many of the discussed operations can be performed in a different sequence or in parallel without materially impacting other operations. The method 1400 as discussed includes operations performed by multiple different actors, devices, and/or systems. It is understood that subsets of the operations discussed in the method 1400 can be attributable to a single actor, device, or system could be considered a separate standalone process or method. The method 1400 can be a method of receiving and processing an order for cooking using automated cooking systems discussed above.

The method 1400 can begin at step 1402, where a food order can be received at a point of sale device. For example, a food order can be received at the point of sale device 1202. At step 1404, the order can be transmitted from the point of sale device to the intermediate system. For example, the order can be transmitted from the point of sale device 1202 to the intermediate system 1204.

At step 1406, the intermediate system can select an available automated cooking system from a plurality of automated cooking systems and assign the order thereto. For example, the intermediate system 1204 can select an available automated cooking system, such as the automated cooker 1206 from the automated cooking systems 1206-1210 and the intermediate system 1204 assign the order to the automated cooker 1206.

At step 1408, the order and/or order instructions can be transmitted from the intermediate system to the assigned automated cooking system. For example, the order and/or order instructions can be transmitted from the intermediate system 1204 to the assigned automated cooking system 1206.

At step 1410, a scanner can scan a code indicative of a first food item added to a cooking vessel removably connected to a housing of the cooking system. For example, the scanner 1216 can scan the code 1214, which can be indicative of the food item 1212, which can be added to the cooking vessel 104, which can be removably connected to the housing 102 of the cooking system 100. At step 1412, the automated cooking system can enable cooking operations. For example, the automated cooking system 1206 can enable cooking operations, such as the cooking operation A.

FIG. 15 shows a flow chart of a method 1500 of operating an automated cooking system, according to one embodiment of the present subject matter. The method 1500 can be a method of operating any of the automated cooking systems discussed above.

The method 1500 can begin at step 1502, where convective heat can be applied to the cooking vessel using a convection heater located within the housing and configured to deliver hot air to the cooking vessel. For example, convective heat can be applied to the cooking vessel 104 using the convection heater 119 located within the housing 102 and configured to deliver hot air to the cooking vessel 104.

At step 1504, the cooking vessel can be heated using radiant heat. For example, the cooking vessel 104 can be heated using radiant heat from the radiant heater 108.

At step 1506, a cooking vessel connected to the housing can be heated using an induction heating device positioned within the housing proximate the cooking vessel. For example, the cooking vessel 104 can be connected to the housing 102 and can be heated using an induction heating device 170 positioned within the housing 102 proximate the cooking vessel 104.

At step 1508, a mixing rotational direction of a mixer can be determined based on the food order. For example, a rotational direction of the mixer 600 can be determined based on an order received at the POS device 1202. At step 1510, a mixing speed can be determined based on the food order. For example, a mixing direction of the mixer 600 can be determined based on an order received at the POS device 1202. At step 1512, a rotational direction interval can be determined using the controller based on the food order. For example, a rotational direction interval of the mixer 600 can be determined based on an order received at the POS device 1202.

In some examples, the controller 119 can determine a mixing time to operate the mixer 600 based on the food order. In some examples, the motor 160 can be operated to rotate the mixer 600 based on the food order, where the mixing of the food can be achieved by operating the mixer 600 in the mixing rotational direction and for the mixing time determined. In some examples, the mixing rotational direction can be varied over time.

In some examples, the controller 115 can determine an intensity of radiant heat to be used based on the food order and the controller 115 can enable the radiant heater 108 to heat the cooking vessel 104, when the lid is in a closed position. Similarly, the controller 115 can determine an intensity of inductive heat to be used based on the food order and the controller 115 can enable the inductive heater 170 to heat the cooking vessel 104 at the intensity of inductive heat. Also, the controller 115 can determine an intensity of inductive heat to be used based on the food order and the controller 115 can enable the inductive heater 170 to heat the cooking vessel 104 at the intensity of inductive heat. In some examples, the controller 115 can determine an amount of time to apply each of the convective heat, the inductive heat, and the radiant heat, based on the food order.

In some examples, the food order can be received at a storage system, such as the storage device 1222. The storage system can enable an indicator of a compartment or a plurality of compartments within the storage system based on the food order, the indicator to indicate to a user a food item to be selected.

Figure 16:
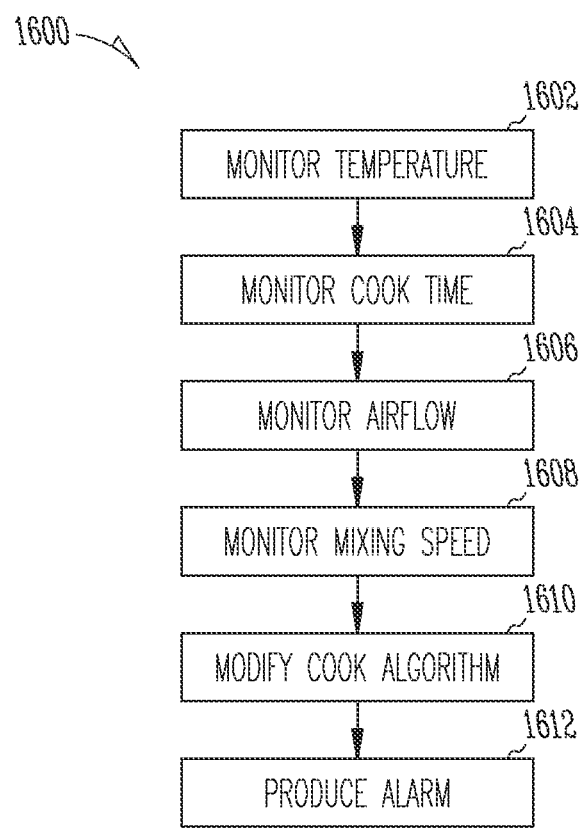
FIG. 16 shows a flow chart of a method of operating an automated cooking system, according to one embodiment of the present subject matter.

FIG. 16 shows a flow chart of a method 1600 of operating an automated cooking system, according to one embodiment of the present subject matter. The method 1600 can be a method of modifying a cooking algorithm using automated cooking systems discussed above.

At step 1602, temperatures of components within the automated cooking system can be monitored. At step 1604, time of food being cooked within the automated cooking system (e.g., automated cooking system 100) can be monitored. At step 1606, airflow of the automated cooking system can be monitored. At step 1608, a speed of the mixer can be monitored.

At step 1610, a program or algorithm for cooking food at the automated cooking system can be modified based on one or more of the temperatures of components within the automated cooking system, time of food being cooked within the automated cooking system, airflow of the convection heater, and the speed of the mixer. At step 1612, an alarm can be produced by the automated cooking system when the cooking operation is complete or based on any of the other conditions monitored.

Figure 17:
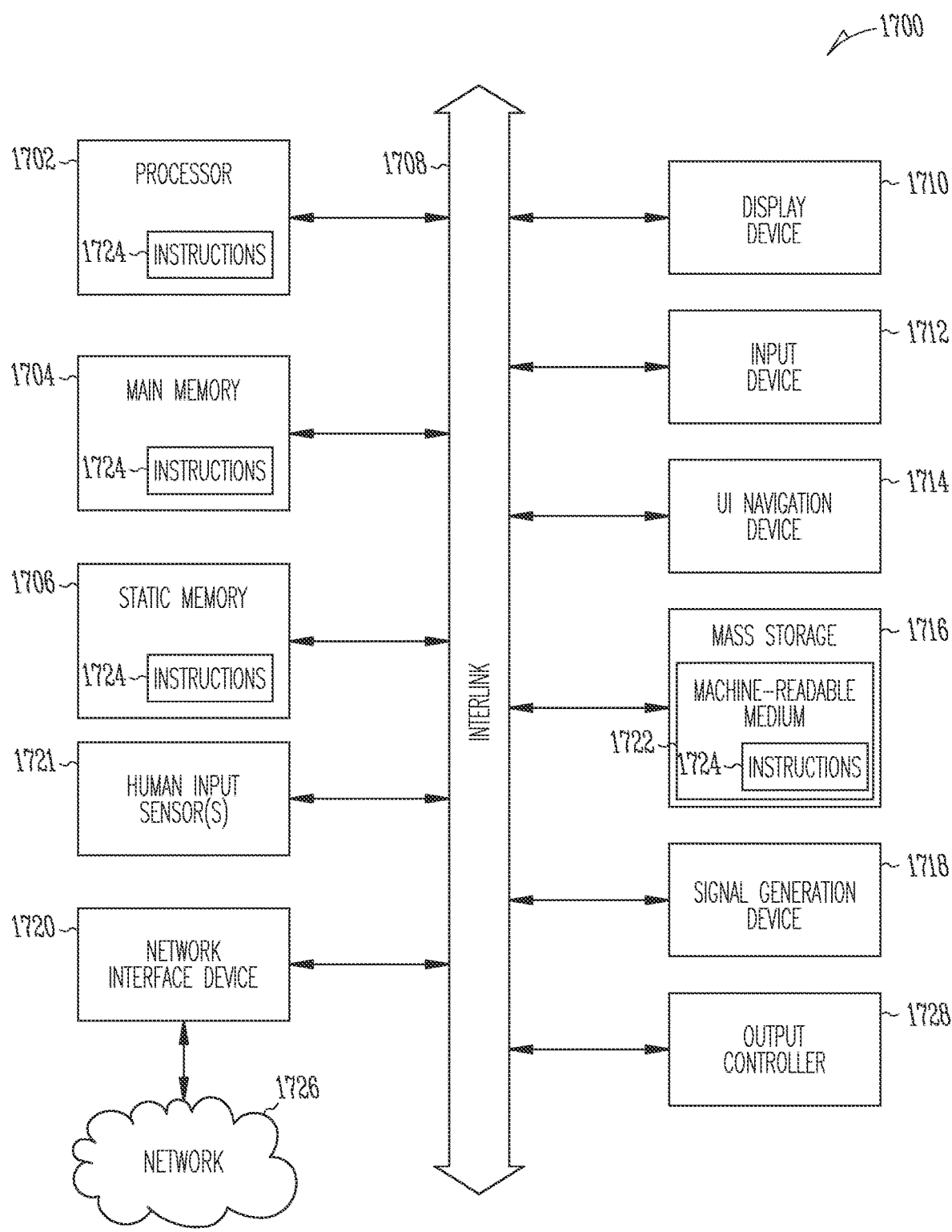
FIG. 17 is a block diagram of architecture for an example computing system used, according to at least one example of the present disclosure.

FIG. 17 is a block diagram illustrating an example computer system machine (machine) upon which any one or more of the previous techniques may be performed or facilitated by. The computer system machine 1700 specifically may be used in connection with facilitating the operations of the controller 115, the POS device 1202, the intermediate computing system 1204, or any other computing platform described or referred to herein. For example, the computer system 1700 can be connected to (or part of) the intermediate computing system 1204 for receipt of and processing of signals to generate and analyze inputs and to create outputs, as well as to compare and analyze inputs and outputs (such as those of FIGS. 12-16) discussed herein.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a smartphone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1700 includes a processor 1702 (e.g., a central processing unit (CPU), a graphics processing unit (GPU) or both), a main memory 1704 and a static memory 1706, which communicate with each other via a link 808 (e.g., an interlink, bus, etc.). The computer system 1700 may further include a video display unit 1710, an alphanumeric input device 1712 (e.g., a keyboard), and a user interface (UI) navigation device 1714 (e.g., a mouse). In an example, the video display unit 1710, input device 1712 and UI navigation device 1714 are a touch screen display. The computer system 1700 may additionally include a storage device 1716 (e.g., a drive unit), a signal generation device 1718 (e.g., a speaker), and a network interface device 1720 which may operably communicate with a communications network 1726 using wired or wireless communications hardware. The computer system 1700 may further include one or more human input sensors 1728 configured to obtain input (including non-contact human input) in accordance with input recognition and detection techniques. The human input sensors 1728 may include a camera, microphone, barcode reader, RFID reader, near field communications reader, or other sensor producing data for purposes of input. The computer system 1700 may further include an output controller 1730, such as a serial (e.g., universal serial bus (USB), parallel, or other wired or wireless (e.g., infrared (IR)) connection to communicate or control one or more peripheral devices (e.g., a printer, card reader, etc.).

The storage device 1716 may include a machine-readable medium 1722 on which is stored one or more sets of data structures or instructions 1724 (e.g., software) embodying or utilized by any one or more of the methodologies or functions described herein. The instructions 1724 may also reside, completely or at least partially, within the main memory 1704, static memory 1706, and/or within the processor 1702 during execution thereof by the computer system 1700, with the main memory 1704, static memory 1706, and the processor 1702 also constituting machine-readable media.

While the machine-readable medium 1722 is illustrated in an example embodiment to be a single medium, the term "machine-readable medium" may include a single medium or multiple media (e.g., a centralized or distributed database, and/or associated caches and servers) that store the one or more instructions 1724. The term "machine-readable medium" shall also be taken to include any tangible medium (e.g., a non-transitory medium) that is capable of storing, encoding or carrying instructions for execution by the computer system 1700 and that cause the computer system 1700 to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1724 may further be transmitted or received over a communications network 1726 using a transmission medium via the network interface device 1720 utilizing any one of a number of well-known transfer protocols (e.g., frame relay, internet protocol (IP), transmission control protocol (TCP), user datagram protocol (UDP), hypertext transfer protocol (HTTP)). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or 5G networks). The term "transmission medium" shall be taken to include any intangible medium that is capable of storing, encoding, or carrying instructions for execution by the computing system 700, and includes digital or analog communications signals or other intangible medium to facilitate communication of such software.

As an additional example, computing embodiments described herein may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 18A:
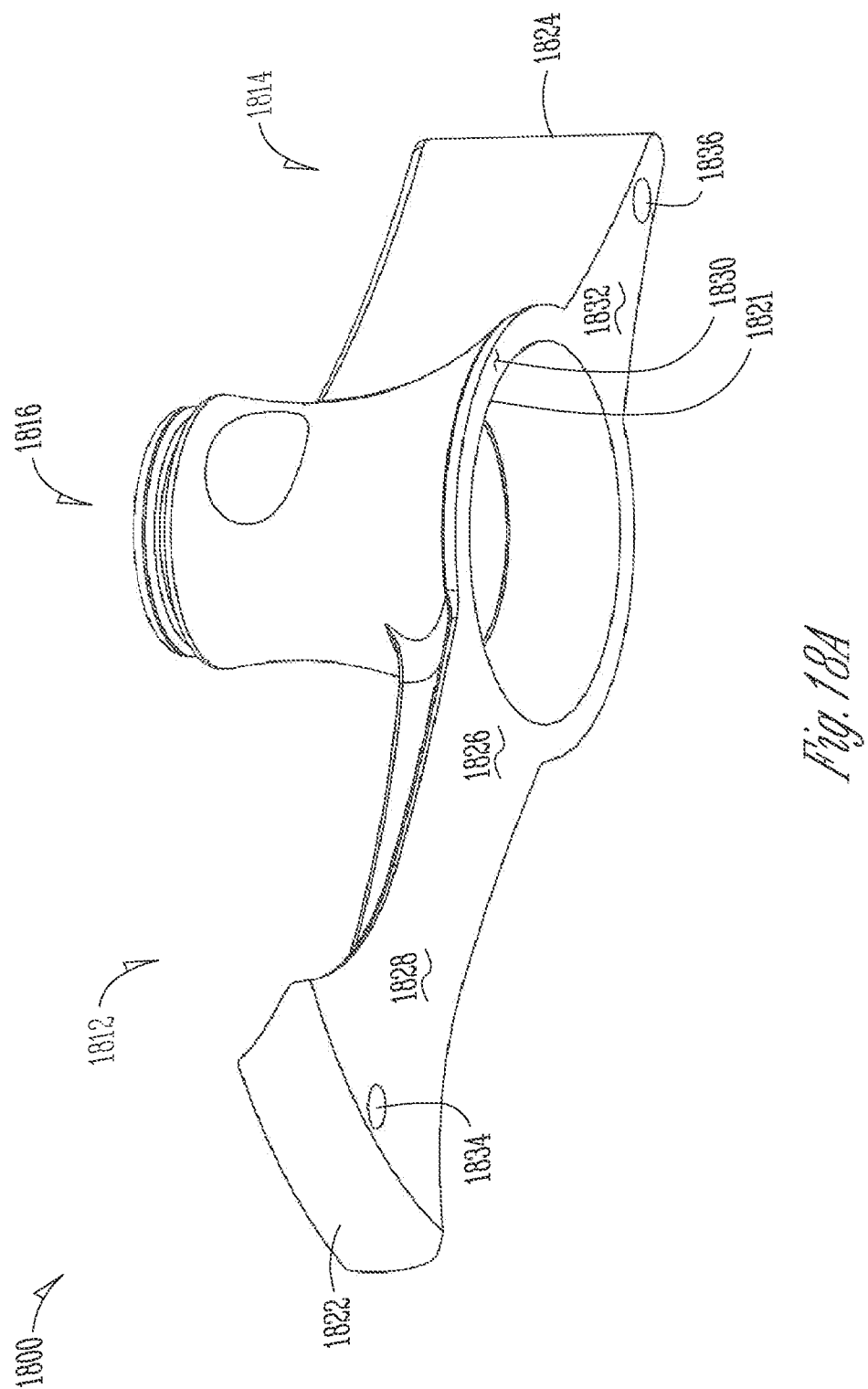
FIG. 18A shows an isometric view of a mixer of an automated cooking system, according to one embodiment of the present subject matter.
Figure 18B:
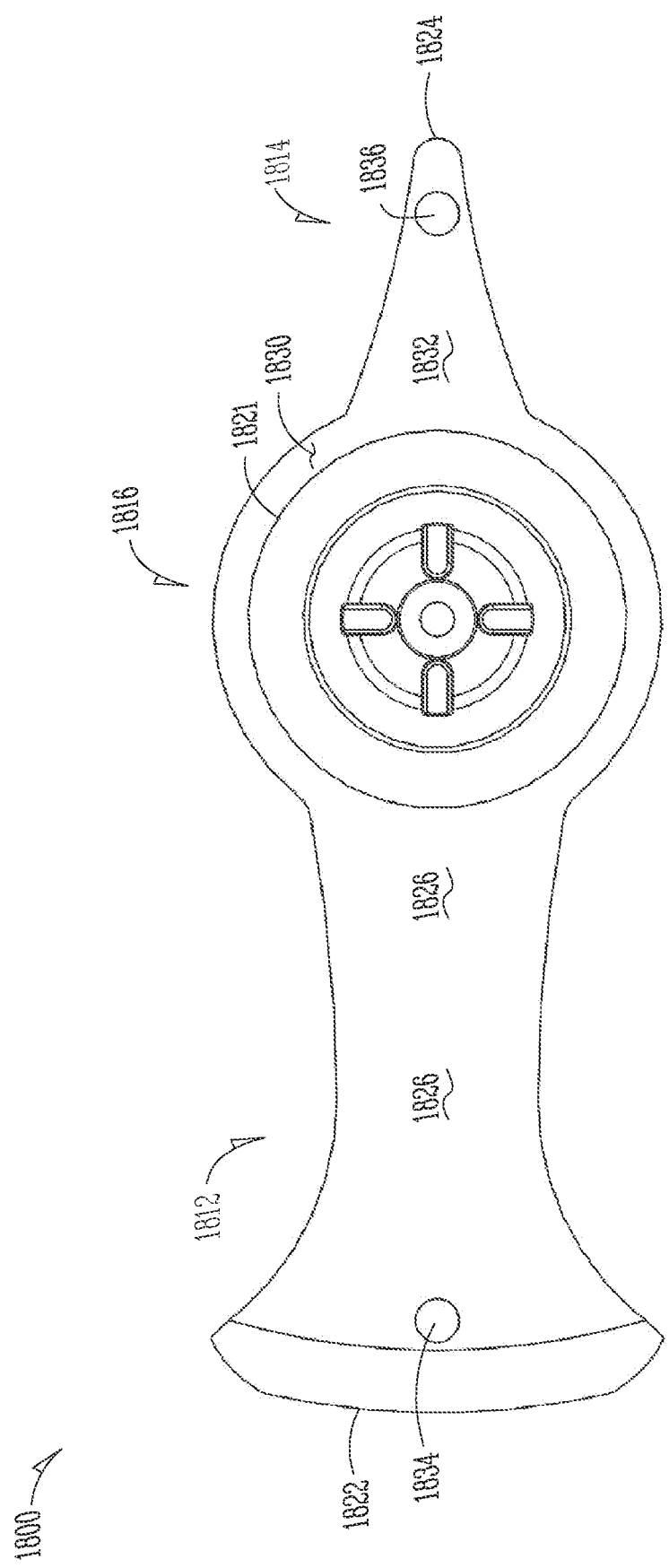
FIG. 18B shows a bottom view of a mixer of an automated cooking system, according to one embodiment of the present subject matter.

FIG. 18A shows an isometric view of a mixer 1800 of an automated cooking system, according to one embodiment of the present subject matter. FIG. 18B shows a bottom view of the mixer 1800 of an automated cooking system, according to one embodiment of the present subject matter. FIG. 18C shows an isometric view of the mixer 1800 of an automated cooking system, according to one embodiment of the present subject matter. FIG. 18D shows a side view of the mixer 1800 of an automated cooking system, according to one embodiment of the present subject matter. FIGS. 18A-18D are discussed concurrently below.

The mixer 1800 can be similar to the mixer 600 discussed above with respect to FIGS. 6B-9B and 10A-10G; however, further details and optional features are described with respect to the mixer 1800. The mixer 1800 can include a blade 1812, a paddle 1814, and a hub 1816. The hub 1816 can include a recess 1821. The blade 1812 can include a distal edge 1822 and the paddle 1814 can include a tip 1824. The mixer 1800 can also include a bottom surface 1826, which can include a paddle bottom surface 1828, a hub bottom surface 1230, and a paddle bottom surface 1832. The blade 1812 can further include a blade stabilizer bore 1834 and the paddle 1814 can further include a paddle stabilizer bore 1836. The mixer 1800 can further include stabilizers 1838 and 1840.

The mixer 1800 can be a rigid or semi-rigid body comprised of materials such as metals, plastics, foams, elastomers, ceramics, composites, or combinations thereof. The mixer 1800 can be made of food-safe metals resistant to heat, such as iron, steel alloys, or the like. As discussed above with respect to the mixer 600, the paddle 1814 can extend radially outward from the hub 1816 and can form the bottom paddle surface 1832. Similarly, the blade 1812 can extend radially outward from the hub 1816 and can form the bottom blade surface 1828. The hub 1816 can include the bottom base surface surrounding the recess 1821. The bottom surface 1826 can be relatively smooth and planar or flat to reduce friction between the mixer 1800 and the pan. In some examples, the bottom surface 1828 can be contoured to match the bottom portion 602 of the wok 126.

As shown in FIGS. 18A and 18B, the blade 1812 can include the blade stabilizer bore 1834 and the paddle 1814 can include the paddle stabilizer bore 1836. The blade stabilizer bore 1834 can extend into the bottom blade surface 1828 and into the blade 1812 where the blade stabilizer bore 1834 can terminate within the blade 1812 before extending therethrough. Similarly, the paddle stabilizer bore 1836 can extend into the bottom paddle surface 1832 and into the paddle 1812 where the paddle stabilizer bore 1836 can terminate within the paddle 1814 before extending therethrough.

Each of the stabilizer 1838 and the stabilizer 1840 can be a rigid or semi-rigid body comprised materials such as one or more of metals, plastics, foams, elastomers, ceramics, composites, or the like. The stabilizers 1838 and 1840 can be inserted into the stabilizer bores 1834 and 1836, respectively. The stabilizers 1838 and 1840 can be secured in the stabilizer bores 1834 and 1836, respectively, via one or more of friction fit, adhesive, fastener, or the like. In some examples, the stabilizers 1838 and 1840 can be unsecured in the stabilizer bores 1834 and 1836, but held in place by the weight of the mixer 1800 such that the stabilizers 1838 and 1840 are captivated between the respective stabilizer bores 1834 and 1836 and the bottom portion 602 of the wok 126.

In operation of some examples, the stabilizers 1838 and 1840 can contact the bottom portion 602 of the wok 126 when the mixer 1800 is secured within the wok 126. When the mixer is in operation (spinning or rotating), the stabilizers 1838 and 1840 can provide stability for the mixer 1800 with respect to the wok 126 by contacting the bottom portion 602. That is, the stabilizers 1838 and 1840 help prevent non-rotational movement of the mixer 1800 during mixing operations. Also, because the stabilizers 1838 and 1840 can be made of low-friction materials, the stabilizers can help reduce power necessary to spin the mixer 1800 within the wok 126.

The stabilizers 1838 and 1840 can be positioned radially away from the hub 216 such as to provide contact points between the stabilizers 1838 and 1840 away from the hub 1816. Because the hub 1816 supports the mixer 1800 away from the bottom portion 602 of the wok 126, rubbing or contact between the mixer 1800 and bottom portion 602 is most likely to occur at the ends of the mixer due to flexing or bending. Placement of the stabilizers 1838 and 1840 away from the hub can help prevent such flexing of the mixer 1800 and resultant contact between the mixer 1800 and the wok 126, helping to reduce wear of the mixer 1800 and the wok 126.

Also, as shown in FIG. 18C, each of the stabilizers can have a contact surface 1842, a bevel 1844, and a side wall 1846. The side walls 1846a and 1846b of the stabilizers 1838 and 1840, respectively, can be sized to fit within the stabilizer bores 1834 and 1836, respectively. The bevel 1844 can connect the contact surface 1842 to the sidewall 1846, which can reduce the probability of an outer edge of the stabilizers 1838 and 1840 from contacting the bottom portion 602 of the wok 126, further helping to reduce wear of the bottom portion 602.

The stabilizers 1838 and 1840 can have around (or cylindrical) shape, as shown in FIGS. 18C and 18D. The stabilizers 1838 and 1840 can have other shapes in other examples, such as a rectangular prism, a triangular prism, truncated prisms, or the like. Though two stabilizers 1838 and 1840 are shown in FIGS. 18C-18D, more or less stabilizers can be used, such as 1, 3, 4, 5, 6, 7, 8, 9, 10, 15, or the like.

It should be understood that the functional units or capabilities described in this specification may have been referred to or labeled as components or modules, in order to more particularly emphasize their implementation independence. Component or modules may be implemented in any combination of hardware circuits, programmable hardware devices, other discrete components. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module. Indeed, a component or module of executable code may be a single instruction, or many instructions, and may even be distributed over several different code segments, among different programs, and across several memory devices.

Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

NOTES AND EXAMPLES

The following, non-limiting examples, detail certain aspects of the present subject matter to solve the challenges and provide the benefits discussed herein, among others.

Example 1 is an automated cooking system comprising: a housing; a cooking vessel removably connected to the housing; an induction heating device within the housing proximate the cooking vessel, the induction heating device configured to heat the cooking vessel using induction; a lid coupled to the housing and movable between a covered and an uncovered position, the lid covering the cooking vessel in the covered position; and a radiant heater connected to the lid, the radiant heater configured to transfer radiant heat toward the cooking vessel when the lid is in the closed position.

In Example 2, the subject matter of Example 1 optionally includes wherein the cooking vessel is a wok.

In Example 3, the subject matter of any one or more of Examples 1-2 optionally include a convection heater configured to deliver hot air to the cooking vessel.

In Example 4, the subject matter of Example 3 optionally includes wherein the housing includes a collar protruding from the housing, the collar configured to support the cooking vessel within the housing.

In Example 5, the subject matter of Example 4 optionally includes wherein the cooking vessel includes a plurality of ports connected to the conduction heater, the ports configured to provide the hot air from the conduction heater into the cooking vessel.

In Example 6, the subject matter of Example 5 optionally includes wherein the ports are located on a top face of the collar and are configured to discharge the hot air toward the lid to circulate within the cooking vessel.

In Example 7, the subject matter of anyone or more of Examples 2-6 optionally include a mixer positioned within the cooking vessel, the mixer configured to rotate relative to the cooking vessel; and a motor located within the housing and operable to drive the mixer to rotate.

In Example 8, the subject matter of Example 7 optionally includes a glass support positioned between the induction heating device and the cooking vessel, the glass support in contact with the cooking vessel to form a seal at the cooking vessel.

In Example 9, the subject matter of Example 8 optionally includes wherein the glass support includes a bore therethrough, the bore configured to receive a spindle therethrough to connect the mixer to the motor.

In Example 10, the subject matter of Example 9 optionally includes wherein the induction heating device includes a bore therethrough, the bore of the induction heating device aligned with the bore of the glass support to receive the motor spindle therethrough.

In Example 11, the subject matter of anyone or more of Examples 1-10 optionally include wherein the lid further comprises a seasoning port resealably openable to receive items into the cooking vessel when the lid is in the covered position.

In Example 12, the subject matter of anyone or more of Examples 1-11 optionally include a convection heater located within the housing and configured to deliver hot air to the cooking vessel; a mixer located within the cooking vessel, the mixer configured to rotate relative to the cooking vessel; and a motor located within the housing and operable to drive the mixer to rotate.

In Example 13, the subject matter of Example 12 optionally includes a controller configured to operate the motor, the induction heater, the radiant heater, and the convection heater based on a cooking algorithm to cook food within the cooking vessel.

In Example 14, the subject matter of Example 13 optionally includes wherein the cooking algorithm is configured to, depending on the ingredients within the cooking vessel, independently adjust a speed of the motor, and heat produced by each of the induction heater, the radiant heater, and the convection heater to cook the food within the vessel, and wherein the cooking algorithm is configured to operate the mixer in both rotational directions at various time intervals.

In Example 15, the subject matter of Example 14 optionally includes a scanner connected to an outer portion of the housing, the scanner configured to scan food item labels and transmit a scan signal to the controller based on the food item labels.

In Example 16, the subject matter of Example 15 optionally includes wherein the controller is configured to adjust the cooking algorithm based on the scan signal.

Example 17 is an automated cooking system comprising: a housing; a cooking vessel removably connected to the housing; an induction heating device within the housing proximate the cooking vessel, the induction heating device configured to heat the cooking vessel using induction; a lid coupled to the housing and movable between a covered and an uncovered position, the lid covering the cooking vessel in the covered position; a radiant heater connected to the lid, the radiant heater configured to transfer radiant heat toward the cooking vessel when the lid is in the closed position; a convection heater located within the housing and configured to deliver hot air to the cooking vessel; a mixer located within the cooking vessel, the mixer configured to rotate relative to the cooking vessel; and a motor located within the housing and operable to drive the mixer to rotate.

In Example 18, the subject matter of Example 17 optionally includes a controller configured to operate the motor, the induction heater, the radiant heater, and the convection heater based on a cooking algorithm to cook food within the cooking vessel; wherein the cooking algorithm is configured to, depending on the ingredients within the cooking vessel, independently adjust a speed of the motor, and heat produced by each of the induction heater, the radiant heater, and the convection heater to cook the food within the vessel, and wherein the cooking algorithm is configured to operate the mixer in both rotational directions at various time intervals.

In Example 19, the subject matter of Example 18 optionally includes a scanner connected to an outer portion of the housing, the scanner configured to scan food item labels and transmit a scan signal to the controller based on the food item labels.

In Example 20, the subject matter of Example 19 optionally includes a conveyer for automatically and programmably introducing one or more ingredients to the cooking vessel.

Example 21 is a cooking assembly comprising: a cooking vessel comprising: a bottom contact portion including a first bore therethrough; a heating portion spaced above the bottom contact portion and including a second bore therethrough; and a sidewall connected to the heating portion and together with the heating portion configured to retain food in the cooking vessel; a mixer located within the cooking vessel, the mixer configured to rotate relative to the heating portion; and a motor connected to the mixer via the first bore and the second bore to drive the mixer to rotate.

In Example 22, the subject matter of Example 21 optionally includes wherein the cooking vessel further comprises a heat spreader positioned between and in contact with the bottom support portion and the heating portion.

In Example 23, the subject matter of Example 22 optionally includes wherein the bottom support portion and the heating portion are substantially comprised of a stainless-steel alloy and the heat spreader is substantially comprised of aluminum.

In Example 24, the subject matter of Example 23 optionally includes an induction heating device positioned below the bottom contact portion, the induction heating device configured to heat the bottom support portion and the heating portion using induction; and a glass support positioned between the induction heating device and bottom support portion.

In Example 25, the subject matter of Example 24 optionally includes wherein the glass support includes a bore therethrough, and wherein the induction heating device includes a bore therethrough, the bore of the induction heating device aligned with the bore of the glass support to receive a motor spindle therethrough.

In Example 26, the subject matter of any one or more of Examples 21-25 optionally include wherein the mixer further comprises a hub and a blade extending radially from the hub, the blade rotatable with the hub to engage the heating portion and the sidewall to mix food within the cooking vessel.

In Example 27, the subject matter of Example 26 optionally includes wherein the mixer further comprises a paddle extending radially from the hub opposite the blade, the blade having a blade length substantially matching a distance between the hub and the sidewall, and the paddle having a paddle length smaller than the blade length.

In Example 28, the subject matter of Example 27 optionally includes wherein the mixer is symmetric about a transverse axis of the mixer and is asymmetric about a longitudinal axis of the mixer.

In Example 29, the subject matter of anyone or more of Examples 27-28 optionally include wherein a distal portion of the blade is flared.

In Example 30, the subject matter of Example 29 optionally includes wherein the blade includes a spine extending from the hub to a tip of the blade.

In Example 31, the subject matter of Example 30 optionally includes wherein the blade includes a first edge positioned on a first side of the spine and a second edge positioned on a second side of the spine opposite the first side.

In Example 32, the subject matter of anyone or more of Examples 30-31 optionally include wherein the first edge has a radius of curvature between the hub and a distal tip and where in the radius of curvature is about 180 and 380 millimeters.

In Example 33, the subject matter of Example 32 optionally includes wherein the first edge and the second edge are swept upwards.

In Example 34, the subject matter of anyone or more of Examples 27-33 optionally include wherein the cooking vessel further comprises a deflector extending radially inward from the sidewall toward the hub of the mixer, the deflector configured to engage the food during mixing operations.

In Example 35, the subject matter of Example 34 optionally includes wherein the deflector is positioned above the heating portion such that the blade passes between the heating portion and the deflector when the blade rotates relative to the heating portion.

In Example 36, the subject matter of Example 35 optionally includes wherein the deflector is positioned above the heating portion such that a distance between the blade and the deflector is small enough to allow the deflector to scrape food off the blade when the blade passes under the deflector during mixing of the food.

In Example 37, the subject matter of Example 36 optionally includes wherein a distance between the deflector and the hub is greater than the paddle length.

In Example 38, the subject matter of anyone or more of Examples 36-37 optionally include wherein the deflector has a geometric shape of a curved triangular prism.

Example 39 is a cooking assembly comprising: a cooking vessel comprising: a bottom contact portion including a first bore therethrough; a heating portion spaced above the bottom contact portion and including a second bore therethrough; and a sidewall connected to the heating portion and together with the heating portion configured to retain food in the cooking vessel; a mixer located within the cooking vessel, the mixer configured to rotate relative to the heating portion, the mixer including a hub and a blade extending radially from the hub, the blade rotatable with the hub to engage the heating portion and the sidewall to mix food within the cooking vessel.

In Example 40, the subject matter of anyone or more of Examples 37-39 optionally include wherein a distal portion of the blade is flared; wherein the blade includes a spine extending from the hub to a tip of the blade; wherein the blade includes a first edge positioned on a first side of the spine and a second edge positioned on a second side of the spine opposite the first side; wherein the first edge has a radius of curvature between the hub and a distal tip and where in the radius of curvature is about 180 and 380 millimeters; and, wherein the first edge and the second edge are swept upwards.

Example 41 is a method of operating an automated cooking system, the method comprising: receiving, from a point of sale device, a food order at an automated cooking system including a housing; heating a cooking vessel connected to the housing using an induction heating device positioned within the housing proximate the cooking vessel; heating the cooking vessel using a radiant heater connected to a lid that is connected to the heating vessel, when the lid is in a closed position; and producing an alert when cooking the food order is complete.

In Example 42, the subject matter of Example 41 optionally includes wherein heating the cooking vessel is controlled by a controller configured to operate the induction heater and the radiant heater.

In Example 43, the subject matter of Example 42 optionally includes determining, using the controller, an intensity of inductive heat based on the food order; and heating the cooking vessel at the intensity of inductive heat.

In Example 44, the subject matter of any one or more of Examples 42-43 optionally include determining, using the controller, an intensity of radiant heat based on the food order; and heating the cooking vessel at the intensity of radiant heat.

In Example 45, the subject matter of any one or more of Examples 41-44 optionally include applying convective heat to the cooking vessel using a convection heater located within the housing and configured to deliver hot air to the cooking vessel.

In Example 46, the subject matter of Example 45 optionally includes determining, using the controller, an intensity of inductive heat based on the food order; and heating the cooking vessel at the intensity of inductive heat.

In Example 47, the subject matter of any one or more of Examples 45-46 optionally include determining, using the controller, an amount of time to apply each of the convective heat, the inductive heat, and the radiant heat, based on the food odder.

In Example 48, the subject matter of anyone or more of Examples 42-47 optionally include mixing, using a mixer positioned within the cooking vessel, food within the cooking vessel; and operating a motor located within the housing to drive the mixer based on the food order.

In Example 49, the subject matter of Example 48 optionally includes determining, using the controller, a mixing time based on the food order.

In Example 50, the subject matter of Example 49 optionally includes determining, using the controller, a mixing rotational direction based on the food order; and mixing the food in the mixing rotational direction and for the mixing time.

In Example 51, the subject matter of Example 50 optionally includes determining, using the controller, rotational direction interval based on the food order.

In Example 52, the subject matter of Example 51 optionally includes varying mixing rotational direction of the mixer over time.

In Example 53, the subject matter of any one or more of Examples 42-52 optionally include receiving the food order at an intermediary computer system.

In Example 54, the subject matter of Example 53 optionally includes selecting, at intermediate system, an available automated cooking system from a plurality of automated cooking systems; and assigning the food order to the available automated cooking system.

In Example 55, the subject matter of anyone or more of Examples 53-54 optionally include receiving the food order at a storage system.

In Example 56, the subject matter of Example 55 optionally includes enabling an indicator of a compartment or a plurality of compartments within the storage system based on the food order, the indicator to indicate to a user a food item to be selected.

In Example 57, the subject matter of any one or more of Examples 42-56 optionally include transmitting the order from the point of sale device to the intermediary system.

In Example 58, the subject matter of anyone or more of Examples 42-57 optionally include determining, using the controller, an intensity of inductive heat based on the food order; heating the cooking vessel at the intensity of inductive heat; determining, using the controller, an intensity of radiant heat based on the food order; heating the cooking vessel at the intensity of radiant heat; applying convective heat to the cooking vessel using a convection heater located within the housing and configured to deliver hot air to the cooking vessel.

Example 59 is a method of operating an automated cooking system, the method comprising: receiving, from a point of sale device, an order including a list of ingredients; receiving, from a scanner, a code indicative of a first food item added to a cooking vessel removably connected to a housing of the cooking system; applying inductive heat to heat the cooking vessel using an induction heating device positioned within the housing proximate the cooking vessel; applying radiant heat to the radiant heater connected to the lid, the radiant heater configured to transfer radiant heat toward the cooking vessel when the lid is in the closed position.

In Example 57, the subject matter of Example 60 optionally includes introducing, automatically, one or more ingredients to the cooking vessel using a programmably controlled conveyor.

In Example 61, the apparatuses or method of anyone or any combination of Examples 1-60 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An automated cooking system comprising:
    a housing;
    a cooking vessel removably connected to the housing;
    an induction heating device within the housing proximate the cooking vessel, the induction heating device configured to heat the cooking vessel using induction;
    a lid coupled to the housing and movable between a covered and an uncovered position, the lid covering the cooking vessel in the covered position; and
    a radiant heater connected to the lid, the radiant heater configured to transfer radiant heat toward the cooking vessel when the lid is in the covered position;
    a convection heater configured to deliver hot air to the cooking vessel;
    wherein the housing includes a collar protruding from the housing, the collar configured to support the cooking vessel within the housing;
    wherein the cooking vessel includes a plurality of ports connected to the convection heater, the ports configured to provide the hot air from the convection heater into the cooking vessel; and
    wherein the ports are located on a top face of the collar and are configured to discharge the hot air toward the lid to circulate within the cooking vessel.

2. The automated cooking system of claim 1, wherein the cooking vessel is a wok.

3. The automated cooking system of claim 2, further comprising:
    a mixer positioned within the cooking vessel, the mixer configured to rotate relative to the cooking vessel; and
    a motor located within the housing and operable to drive the mixer to rotate.

4. The automated cooking system of claim 3, further comprising:
a glass support positioned between the induction heating device and the cooking vessel, the glass support in contact with the cooking vessel to form a seal at the cooking vessel.

5. The automated cooking system of claim 4, wherein the glass support includes a bore therethrough, the bore configured to receive a spindle therethrough to connect the mixer to the motor.

6. The automated cooking system of claim 5, wherein the induction heating device includes a bore therethrough, the bore of the induction heating device aligned with the bore of the glass support to receive the motor spindle therethrough.

7. The automated cooking system of claim 1, wherein the lid further comprises a seasoning port resealably openable to receive items into the cooking vessel when the lid is in the covered position.

8. The automated cooking system of claim 1, further comprising:
a convection heater located within the housing and configured to deliver hot air to the cooking vessel;
a mixer located within the cooking vessel, the mixer configured to rotate relative to the cooking vessel; and
a motor located within the housing and operable to drive the mixer to rotate.

9. The automated cooking system of claim 8, further comprising:
a controller configured to operate the motor, the induction heater, the radiant heater, and the convection heater based on a cooking algorithm to cook food within the cooking vessel.

10. The automated cooking system of claim 9, wherein the cooking algorithm is configured to, depending on ingredients within the cooking vessel, independently adjust a speed of the motor, and heat produced by each of the induction heater, the radiant heater, and the convection heater to cook the food within the vessel, and wherein the cooking algorithm is configured to operate the mixer in both rotational directions at various time intervals.

11. The automated cooking system of claim 10, further comprising:
a scanner connected to an outer portion of the housing, the scanner configured to scan food item labels and transmit a scan signal to the controller based on the food item labels.

12. The automated cooking system of claim 11, wherein the controller is configured to adjust the cooking algorithm based on the scan signal.

13. An automated cooking system comprising:
a housing;
a cooking vessel removably connected to the housing;
an induction heating device within the housing proximate the cooking vessel, the induction heating device configured to heat the cooking vessel using induction;
a lid coupled to the housing and movable between a covered and an uncovered position, the lid covering the cooking vessel in the covered position;
a radiant heater connected to the lid, the radiant heater configured to transfer radiant heat toward the cooking vessel when the lid is in the covered position;
a convection heater located within the housing and configured to deliver hot air to the cooking vessel;
a mixer located within the cooking vessel, the mixer configured to rotate relative to the cooking vessel; and
a motor located within the housing and operable to drive the mixer to rotate
wherein the housing includes a collar protruding from the housing, the collar configured to support the cooking vessel within the housing;
wherein the cooking vessel includes a plurality of ports connected to the convection heater, the ports configured to provide the hot air from the convection heater into the cooking vessel; and
wherein the ports are located on a top face of the collar and are configured to discharge the hot air toward the lid to circulate within the cooking vessel.

14. The automated cooking system of claim 13, further comprising:
a controller configured to operate the motor, the induction heater, the radiant heater, and the convection heater based on a cooking algorithm to cook food within the cooking vessel;
wherein the cooking algorithm is configured to, depending on ingredients within the cooking vessel, independently adjust a speed of the motor, and heat produced by each of the induction heater, the radiant heater, and the convection heater to cook the food within the vessel, and wherein the cooking algorithm is configured to operate the mixer in both rotational directions at various time intervals.

15. The automated cooking system of claim 14, further comprising:
a scanner connected to an outer portion of the housing, the scanner configured to scan food item labels and transmit a scan signal to the controller based on the food item labels.

* * * * *